US011227104B2

(12) United States Patent
Sankaran et al.

(10) Patent No.: US 11,227,104 B2
(45) Date of Patent: Jan. 18, 2022

(54) COMPOSITE DATA CREATION WITH REFINEMENT SUGGESTIONS

(71) Applicant: Informatica LLC, Redwood City, CA (US)

(72) Inventors: Mohan Sankaran, Cupertino, CA (US); Andrew Comstock, Menlo Park, CA (US); Kiran Bagepalli, Union City, CA (US); Gautam H. Mudunuri, Fremont, CA (US); Akin Dirik, Palo Alto, CA (US); Frank Beier, San Carlos, CA (US); Mohini Wettasinghe, Redwood City, CA (US); Ivan Chong, Hillsborough, CA (US)

(73) Assignee: INFORMATICA LLC, Redwood City, CA (US)

( * ) Notice: Subject to any disclaimer, the term of this patent is extended or adjusted under 35 U.S.C. 154(b) by 1214 days.

(21) Appl. No.: 14/708,146

(22) Filed: May 8, 2015

(65) Prior Publication Data

US 2015/0324346 A1 Nov. 12, 2015

Related U.S. Application Data

(60) Provisional application No. 61/991,551, filed on May 11, 2014.

(51) Int. Cl.
 *G06F 40/18* (2020.01)
 *G06F 16/2455* (2019.01)
 *G06F 16/25* (2019.01)

(52) U.S. Cl.
 CPC .......... *G06F 40/18* (2020.01); *G06F 16/2456* (2019.01); *G06F 16/25* (2019.01)

(58) Field of Classification Search
 CPC .................. G06F 17/246; G06F 17/30498
 See application file for complete search history.

(56) References Cited

U.S. PATENT DOCUMENTS

7,725,498 B2  5/2010 Barsness et al.
9,477,703 B1 * 10/2016 Criss .................. G06F 17/2211
(Continued)

OTHER PUBLICATIONS

"VLDB 2001 27th International Conference on Very Large Data Bases," Sep. 11-14, 2001, <http://www.dia.uniroma3.it/~vidbproc>, pp. 1-11. (Year: 2001).*

(Continued)

*Primary Examiner* — Kyle R Stork
(74) *Attorney, Agent, or Firm* — Amardeep S. Grewal; Reed Smith LLP

(57) ABSTRACT

A data profiling module receives user selection of spreadsheets, and the data from the selected spreadsheets is profiled. At least one matching column is identified among the spreadsheets selected. The data profiling module calculates a match metric for the at least one matching column, and unifies the spreadsheets into a single composite spreadsheet using the at least one identified matching column. A preview view of a composite spreadsheet is generated, visually indicating the at least one matching column, any non-matching columns between the spreadsheets, and the match metric for the matching columns. An action history module identifies spreadsheets for use in the procedure, and stores any action applied to the spreadsheets as a procedure template that can be applied to a plurality of other spreadsheets.

29 Claims, 29 Drawing Sheets

(56) References Cited

U.S. PATENT DOCUMENTS

| | | | |
|---|---|---|---|
| 2002/0078008 A1* | 6/2002 | Cambot | G06F 17/30398 |
| 2002/0116417 A1* | 8/2002 | Weinberg | G06F 17/243 |
| | | | 715/212 |
| 2002/0161799 A1 | 10/2002 | Maguire, III et al. | |
| 2012/0173226 A1* | 7/2012 | McEvoy | G06F 17/245 |
| | | | 704/3 |
| 2013/0346429 A1 | 12/2013 | Bratz et al. | |
| 2014/0046927 A1 | 2/2014 | Nelke et al. | |
| 2015/0113390 A1* | 4/2015 | Vagell | G06F 17/212 |
| | | | 715/255 |
| 2015/0199352 A1* | 7/2015 | Bush | G06F 17/3033 |
| | | | 707/745 |

OTHER PUBLICATIONS

"ACM Digital Library," <https://dl.acm.org/citation.cfm?id=672045>. (Year: 2019).*

European Extended Search Report, European Application No. 15167202.9, dated Sep. 30, 2015, 10 pages.

European Extended Search Report, European Application No. 15167219.3, dated Oct. 1, 2015, 10 pages.

Raman, V. et al., "Potter's Wheel: An Interactive Data Cleaning System," Proceedings of the 27$^{th}$ International Conference on Very Large Data Bases, Aug. 11, 2001-Sep. 14, 2001, pp. 381-390, [Online] [Retrieved on Sep. 16, 2015] Retrieved from the Internet<URL:http://www.vldb.org/conf/2001/P381.pdf>.

Scaffidi, C. et al., "Topes: Reusable Abstractions for Validating Data," ACM/IEEE 30th International Conference on Software Engineering, May 10, 2008, pp. 1-10.

* cited by examiner

COMPOSITE DATA CREATION WITH REFINEMENT SUGGESTIONS

CROSS-REFERENCE TO RELATED APPLICATIONS

This application claims the benefit of U.S. Provisional Application No. 61/991,551, filed May 11, 2014, which is incorporated by reference in its entirety. This application is also related to U.S. application Ser. No. 14/706,828, filed on May 7, 2015, entitled "Grid Format Data Viewing and Editing Environment" the contents of which are also incorporated by reference in its entirety.

BACKGROUND

1. Field of Disclosure

The disclosure generally relates to extract, transform and load data processes in database management systems and data warehouses, and, more specifically, to computer executed methods for displaying data extracted from data sources in a data viewing and editing environment, and generating suggestions for refinement of data presentations.

2. Background Information

Data from multiple external data sources typically transitions through an extract, transform and load (ETL) process when being ingested into an internal system. As a part of the ETL process, the data is (i) extracted, (ii) transformed according to business requirements and requirements of the internal data source, and (iii) loaded into the a target data store of the internal system. While some parts of the ETL process can be automated, large parts of the process still require human intervention, especially when transforming extracted data to conform to business logic or correcting errors that were introduced as a result of the ingestion. The tools available to the data analysts who perform tasks related to the ETL process typically provide a low-level view into the internal data source that requires knowledge of the internal structure on the data source and data query languages, such as structured query language (SQL). Because of the vast amounts of data that is involved in a single ETL process, performing tasks related to the ETL with tools that are unintuitive and require specialized knowledge makes the tasks cumbersome and time consuming.

SUMMARY

A data profiling module is configured to receive multiple spreadsheets and create a single composite spreadsheet. The data profiling module receives a user selection of multiple spreadsheets and reads the spreadsheets from a storage device. Typically a spreadsheet has data records arranged in rows, with columns containing different attributes or fields of data. The profiling module extracts the data from the selected spreadsheets and profiles the data with respect to data types and attributes of the data. At least one matching column is identified among the selected spreadsheets. The data profiling module calculates a match metric for the at least one matching column, and unifies the spreadsheets into a single composite spreadsheet using the at least one identified matching column. A preview view of a composite spreadsheet is generated, visually indicating the at least one matching column, any non-matching columns between the spreadsheets, and the match metric for the matching columns.

A user interface of a structured data manipulation system includes a data section, an information section, and various controls. The data section is for displaying the spreadsheets for analysis. The information section is for displaying profiled information about the spreadsheets. A composite data control is for receiving a command to unify the spreadsheets into a composite spreadsheet based on at least one matching column among the spreadsheets. The composite data control may be multiple different controls for the various unifying actions. An "action," as used herein, is a programmatic operation performed on specific data to produce a transformed or altered data set. Specific actions include join (combine), union (merge), lookup, column split, column add (data enhancement), pattern recognition and inconsistency rectification, data cleansing, data consistency, data standardization, etc. One the composite spreadsheet is formed, the data section further includes a preview of the composite spreadsheet, showing the matching column(s) and the non-overlapping columns between the spreadsheets. In addition, the information section includes a match metric calculated for the composite spreadsheet that shows the how well matched the spreadsheets are.

An action history module identifies spreadsheets for use in the procedure, and tracks any action applied to the spreadsheets. Actions are identified as associated with unifying at least a subset of the spreadsheets into a composite spreadsheet. Actions taken on the composite spreadsheet also are identified by the action history module. The unifying actions and the actions taken on the composite spreadsheet are stored by the action history module as a procedure template that can be applied to a plurality of other spreadsheets.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 5B illustrates an example of a user interface during the process of a combine function according to one embodiment.

FIG. 7A illustrates an example of a user interface prior to a union function according to one embodiment.

FIG. 8A illustrates an example of a user interface during the process of a merge function according to one embodiment.

FIG. 8B illustrates an example of a user interface following the merge function according to one embodiment.

Figure 9A:
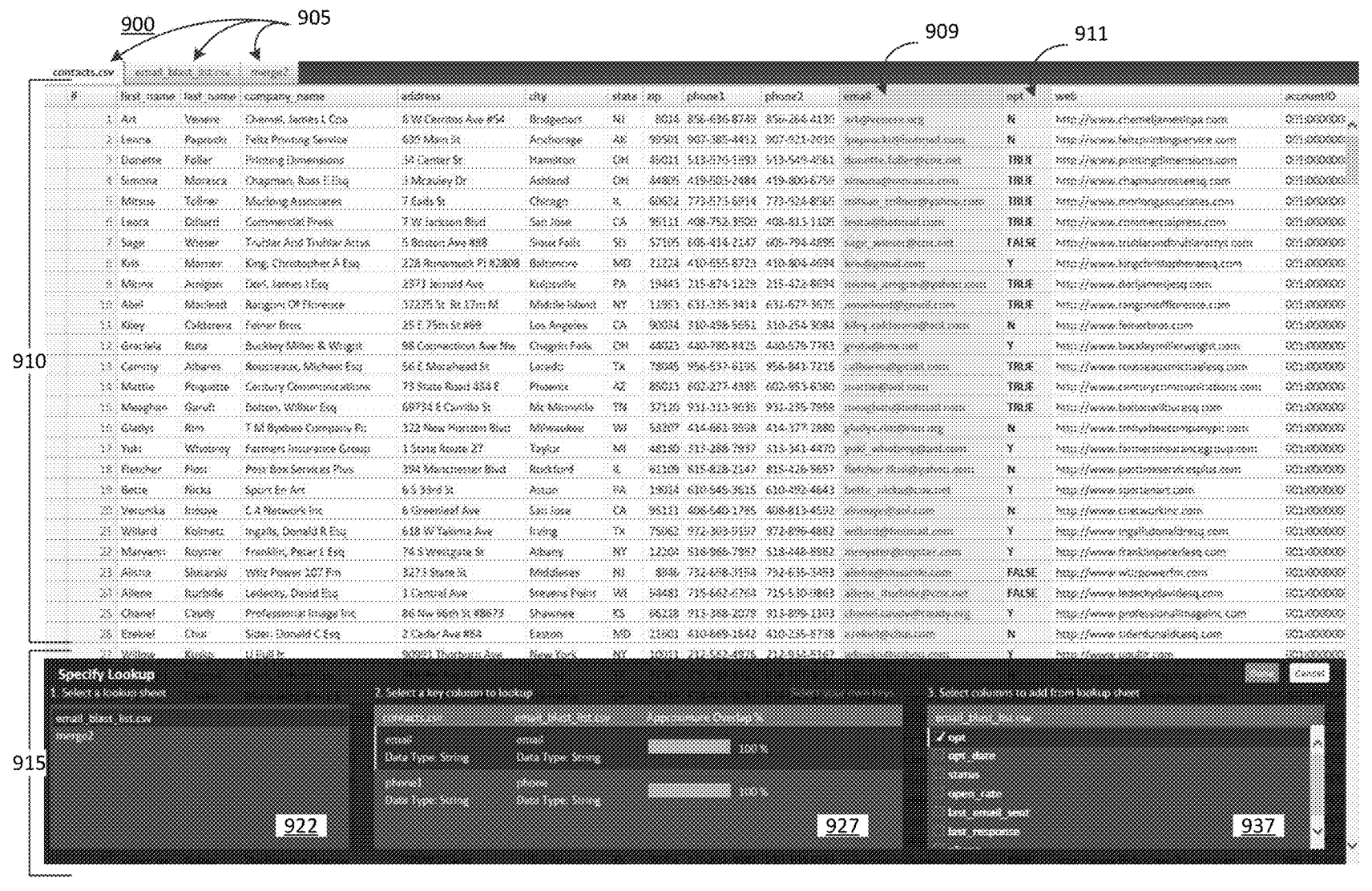
Figure 9B:
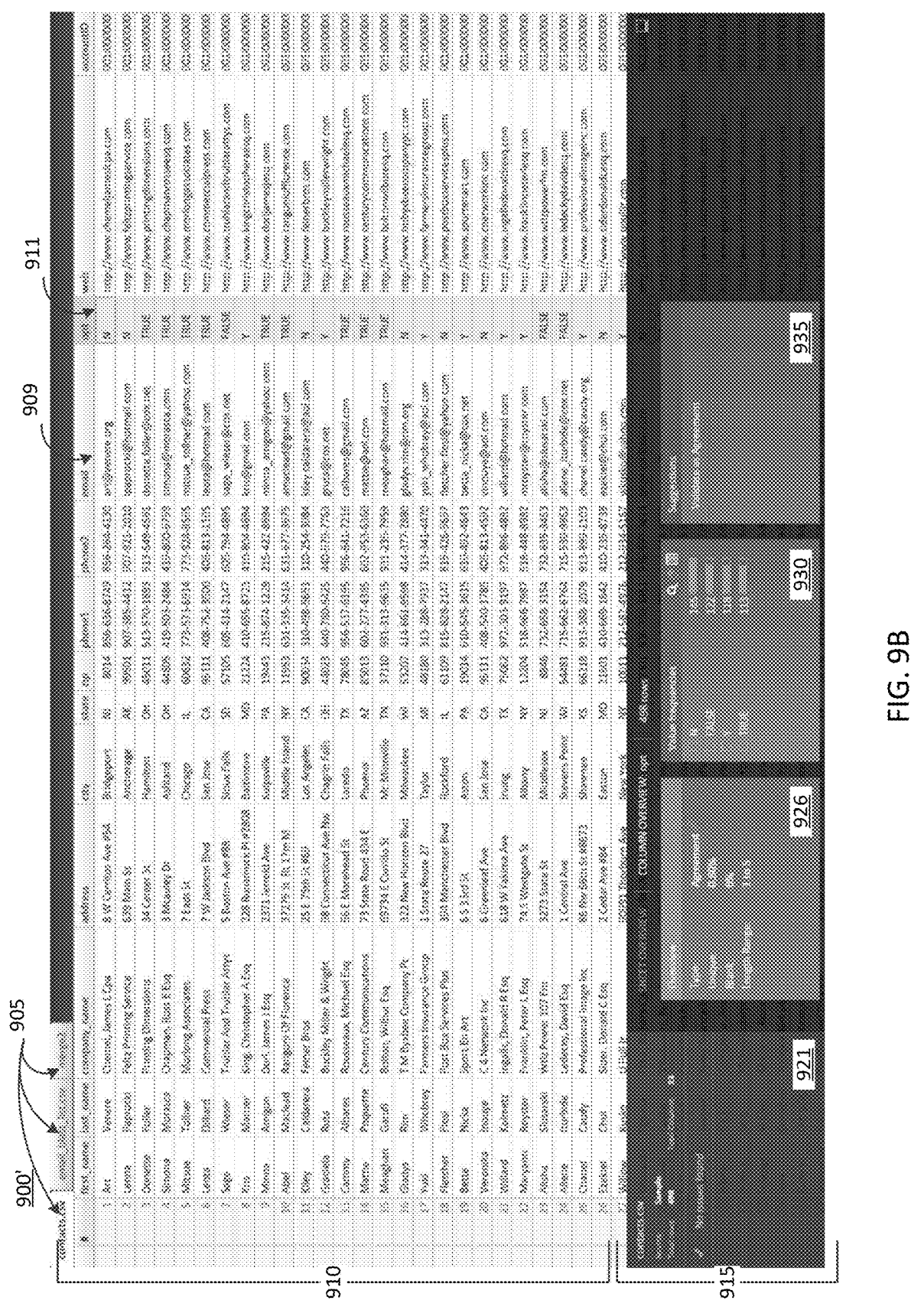

FIG. 9A illustrates an example of a user interface during the process of a lookup function according to one embodiment.

FIG. 9B illustrates an example of a user interface following addition of a lookup column according to one embodiment.

FIG. 10 illustrates an example of a user interface during the process of applying data enrichment according to one embodiment.

FIG. 12A illustrates an example of a user interface with a history of actions taken on spreadsheets according to one embodiment.

FIG. 13A shows an example of a user interface showing application of a system suggestion according to one embodiment.

FIG. 13B shows an example of a user interface showing application of a system suggestion according to one embodiment.

FIG. 14A shows an example of a user interface showing application of a system suggestion according to one embodiment.

FIG. 14B shows an example of a user interface showing application of a system suggestion according to one embodiment.

FIG. 15 shows an example of a user interface with a graphical representation of column data according to one embodiment.

FIG. 17A shows an example of a user interface in which a user is interacting with the graphical representation of column data according to one embodiment.

FIG. 17B shows an example of a user interface in which a user is interacting with the graphical representation of column data according to one embodiment.

FIG. 17C shows an example of a user interface after value changes according to one embodiment.

DETAILED DESCRIPTION

System Architecture

Figure 1:
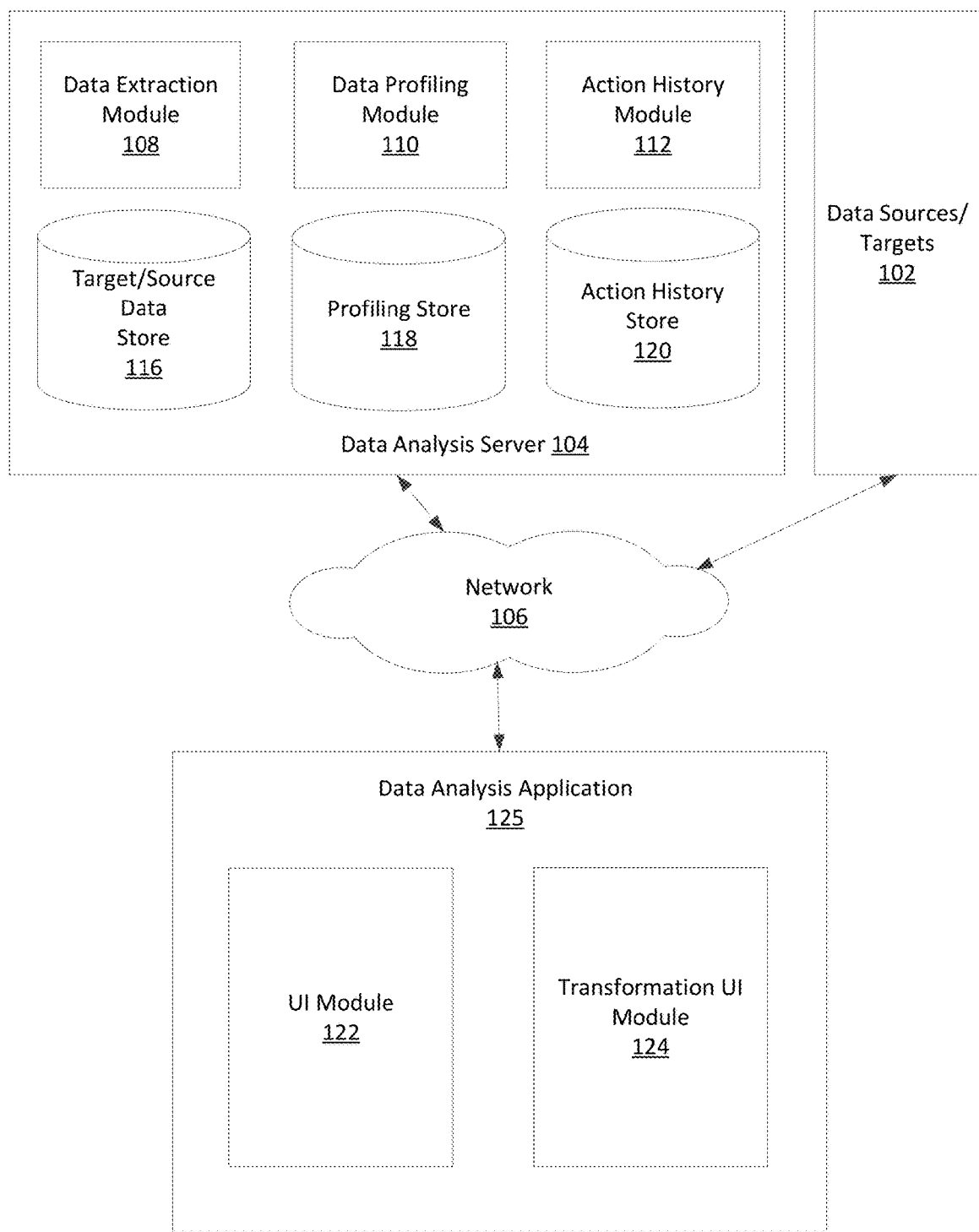
FIG. 1 is a high-level block diagram of a computing environment for analyzing data extracted from one or more data sources according to one embodiment.

FIG. 1 is a high-level block diagram of a computing environment 100 for previewing a composite data set for data extracted from one or more data sources 102 according to one embodiment. As shown, the computing environment 100 includes data sources/targets 102, a data analysis server 104, and a data analysis application 125.

The data sources/targets 102 (also individually referred to herein as datasource/target 102 and) include one or more systems for managing data. Each data source/target 102 provides a channel for accessing and updating data stored within the data source/target 102. Data in a data source/target 102 may be associated with users, groups of users, entities, and/or workflows. For example, a data source/target 102 may be a customer relationship management (CRM) system or a human resource (HR) management system that stores data associated with all individuals associated with a particular entity. Examples of data sources 102 include databases, applications, and local files. Similarly, these sources 102 can act as targets for exporting data. Common export targets include Tableau, Salesforce Wave, and Excel.

The data analysis server 104 extracts data from the data sources/targets 102, processes the data, and provides the processed data to the data analysis application 125 so that the data may be displayed to and manipulated by a user. To perform these functions, the data analysis server 104 includes a data extraction module 108, a data profiling module 110, and an action history module 112. Further, to store data related to these functions, the data profiling server 104 includes a target/source data store 116, profiling store 118, and an action history store 120. The various modules of the analysis server 104 are not standard components of a generic computer system, and provide specific functionality as described herein. In addition, the functions and operations of the modules is sufficiently complex as to require an implementation by a computer system, and as such cannot be performed in any practical embodiment by mental steps in the human mind. Each of these components is described in greater detail below.

The data extraction module 108 is configured to identify data in the data sources/targets 102 that is to be extracted, retrieve that data from the data sources/targets 102 and store the data in the target/source data store 116, and is one means for so doing. In operation, the data extraction module 108 identifies one or more data sources/targets 102 from which to extract data. The data extraction module 108 also identifies the specific data stored in the identified data sources/targets 102 that is to be extracted. The identification of the data sources/targets 102 and/or the specific data stored therein may be made based on instructions received from a user conducting a data profiling operation. Alternatively, such identification may be made based on one or more business logic definitions that specify external data sources from which to extract data.

The data extraction module 108 extracts the identified data from the data sources/targets 102 over the data access channels provided by the data sources/targets 102. In one embodiment, a data access channel is a secure data transfer protocol that allows the data extraction module 108 to communicate securely with a data sources/targets 102 to retrieve and transmit data to and from the data sources/targets 102. Once the data is extracted from the data sources/targets 102, the data extraction module 108 stores the data in the target/source data store 116.

The data profiling module 110 is configured to process the data extracted from the data sources 102 and stored in the target data store 116 to fully profile every column, row, and field of the data, and is one means for so doing. In operation, for each column in the target/source data store 116 that stores extracted data, the data profiling module 110 performs one or more data profiling functions on the data fields in the column to identify data types, data domains, and other information about the data values in the data fields.

As part of the data profiling, the data profiling module 110 identifies data patterns in the data. The data profiling module 110 stores in the profiling store 118 analyzed data about each data field of a column on which the profiling functions are performed. In operation, for a given column, the data profiling module 110 determines a pattern associated with the column that indicates how values in that column should be formatted. If a data field in a column stores data that does not conform to a pattern associated with the column, then the system may make a suggestion to correct the data. A list of specific patterns may be included in the data type listing and associated rules of the suggestion engine. For example, the data profiling module 110 determines suggestions for transforming the value in a data field to comply with the determined pattern. The system stores patterns and rules that may vary for each data set and that correspond to the various data types, as well as formatting, enterprise specific data, profiling information learned from previous users, and any other profiling information that may be applicable to the various data sets. In addition, the data profiling module 110 may call upon external sources for data enrichment, such as Duns & Bradstreet, Nielson, etc.

The data profiling module 110 receives user selection of spreadsheets, and the data from the selected spreadsheets is profiled by the data profiling module 110. The data profiling module 110 also identifies at least one matching column among the spreadsheets selected. The data profiling module 110 calculates a match metric for the at least one matching column, and unifies the spreadsheets into a single composite spreadsheet using the at least one identified matching column. The data profiling module 110 generates a preview view of the composite spreadsheet, visually indicating the at least one matching column, any non-matching columns between the spreadsheets, and the match metric for the matching columns.

The action history module 112 is configured to track and store in the action history store 120 the actions applied to the individual and composite spreadsheets, and is one means for so doing. In operation, when an action is applied to a spreadsheet(s) or composite spreadsheet, the action history module 112 stores in the action history store 120 the particular action that was applied and to which data. Therefore, the actions applied to the data over time are captured in the action history store 120 and any action can be undone or redone.

The action history module 112 identifies spreadsheets for use in the procedure, and tracks any action applied to the spreadsheets. The action history module 112 identifies actions associated with unifying at least a subset of the spreadsheets into a composite spreadsheet. In addition the actions taken on the composite spreadsheet also are identified by the action history module 112. The unifying actions and the actions taken on the composite spreadsheet are stored by the action history module 112 as a procedure template that can be applied to a plurality of other spreadsheets.

The data analysis application 125 is a software application that enables users to manipulate data extracted from the data sources/targets 102 by the data analysis server 104 and select and specify actions to be performed on the individual spreadsheet, unifying actions of the spreadsheets, or actions on the composite spreadsheet, and is one means for so doing. The data analysis application 125 may be a desktop application, a mobile application or web-based application. In various embodiment, the data analysis application 125 is device agnostic. To perform its various functions, the data analysis application 125 includes a user interface (UI) module 122 and an action UI module 124.

In some embodiments, the data analysis application 125 is part of a larger cloud architecture, along with various onsite and external sources and targets, as well as enrichment services involved in the processes described herein. Sources/targets 102 can import data, and after the processes described herein, the same sources/targets 102 systems can pull data back in.

The UI module 122 receives data for display in the UI, generates a user interface corresponding to received data, populates the interface with the data received, displays data refinement suggestions, generates a column summary associated with a selected column.

The action UI module 124 provides one or more action controls for applying to data in the spreadsheets. Specifically, the action UI module 124 provides controls that allow a user of the data profiling application 125 to select, specify and/or cause the application of actions associated with the spreadsheets.

According to one embodiment, a user interface of a structured data manipulation system as provided by UI module 122 and action UI module 124 includes a data section, an information section, and various controls. The data section of the UI is for displaying the spreadsheets for analysis. The information section of the UI is for displaying profiled information about the spreadsheets. A composite data control of the UI is for receiving a command to unify the spreadsheets into a composite spreadsheet based on at least one matching column among the spreadsheets. Specific examples of the various user interfaces are discussed below.

For each action performed, the action UI module 124 transmits the action information to the action history module 112 in the data analysis server 104. The action history module 112 stores in the action history store 120 the actions applied to the data. As discussed above, the actions applied to the data over time are captured in the action history store 120 and any step in the action history can be undone, redone, or applied to different data.

Figure 2:
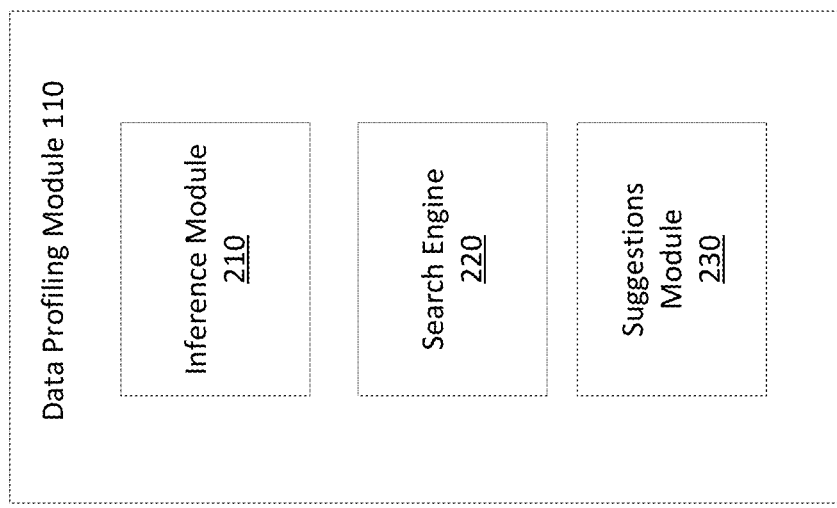
FIG. 2 shows a more detailed view of the system components according to one embodiment.

FIG. 2 shows a more detailed view the data profiling module 110 according to one embodiment. An inference module 210 discovers characteristics of columns and tables. It leverages profiling functionality, data type information, and domains as well as content from data quality sources. The inference module 210 provides enhanced data profiling for business users (e.g., by recognizing data such as state, phone number, etc.).

A search engine 220 is used to provide contextual suggestions for the various data types according to one embodiment, however other more sophisticated recommendation architectures can be used for community/crowd behaviors. The system stores rules that may vary for each data set. A first set of rules pertains to data type (e.g., String, Numeric, Date, etc., where date would provide suggestions to assist in extracting month, day of week, year, quarter, etc.). A second set of rules are based on data domains. Examples of data domains are: for Duns and Bradstreet numbers (providing suggestions to enrich with D&B data); street, city, and zip code together (suggestion to validate address); Country (enrich for that country); zip code to latitude (display in map); email domain; URL domain; SalesForceID, etc. In some instances, different rules or a subset of rules may be applicable to the particular data set being manipulated. A third set of rules are based on enterprise data (i.e., company specific data): specific codes, learning from expert users within the company, industry specific codes or data formatting, etc. the recommendation engine also may learn from usage.

A suggestions module 230 uses the inference data to search for suggestions relating to the content. The suggestions module 230 uses the characteristics of the selected data to filter the operations that are appropriate to suggest to the user. E.g., a "merge" should only be suggested if two or more columns are selected, a split suggested on a string column (not a numeric one), etc. The suggestion module 230 has intelligence to automatically identify data type, identify the data domain type, and suggest/recommend appropriate operations for execution on the data set. The system can learn from user actions and capture the data for a future data set, learn from suggestions to increase the relevance of suggestions. The system can capture a data experts actions and suggest to a novice via sharing when a similar characteristics shows up. Once the system has a list of suggestions, it returns them to the user using basic ranking logic.

In addition the suggestions module 230 captures the users' feedback and reactions to the suggestions, as well as alternative operations for improvement of the ranking model and to leverage collaborative filtering. E.g., if users who trim company names typically do so by standardizing abbreviations like Ltd. and PLC, a suggestion to apply this change to a subsequent data set will rank higher in the suggestions list for a data set including company names. The system may use various forms of machine learning or other learning models to use information about changes applied by one user and provide those changes as suggestions to subsequent users.

Data Suggestions Process Flow

For joining disparate data, the system provides simplicity to the user by providing more intelligence at each step of the process. The system recognizes likely sources, provides visualization of most reasonable keys or overlapping columns, and improved summarization. The power of the process is improved access to more data sources and locations, improved performance and response time, and comprehensive summarization of key identification.

The user is aided in understanding the data by the system providing pattern recognition & presentation, range summarization for numeric values, type specific options, including maps for locations, new types of semantic inference & recognition, recognition of company-specific semantic inference, and presentation customization.

Errors are easily identified by noting numeric outliers, identifying duplicate records (including perfect and imperfect matches), and providing comprehensive data quality and data expansion suggestions.

Asynchronous operation allows for a data extract to be executing while the user continues further cleansing in UI.

Data support includes semantic identification including recognition of emails, people names, company names, locations, providing sample operations for data manipulation, e.g., split & extract and formula language, mimicking spreadsheet functions. Ease of use features include filtering & sorting, undo/redo, and historic rollback.

Figure 3:
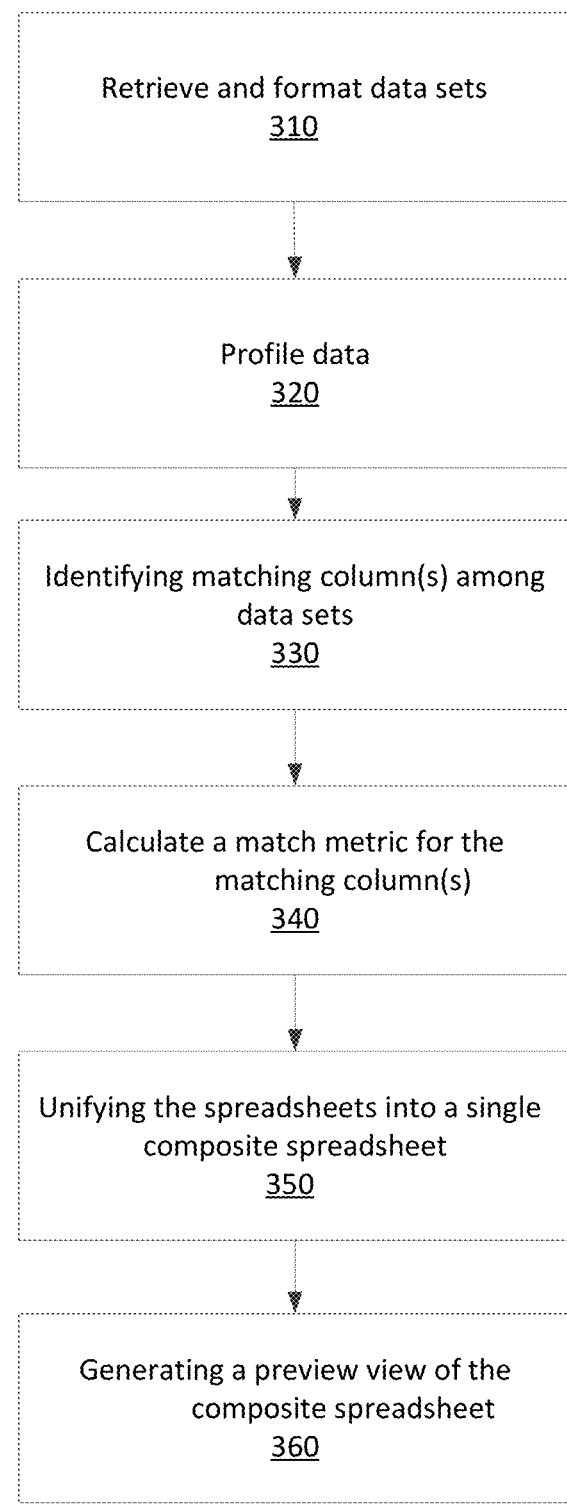
FIG. 3 is a flowchart illustrating a method of previewing a composite data set according to one embodiment.

FIG. 3 is a flowchart illustrating a method of previewing a composite data set according to one embodiment. The method begins with retrieving 310 from one or more data sources 102 first and a second data sets, and formatting each data set into a plurality of columns of data values. In this step the user selects the data she or he is interested in manipulating. This example uses two spreadsheets, but more spreadsheets could be used. A "spreadsheet," as used herein, is any data file in which data is arranged in a table of rows and columns, and may be in various formats, such as CSV (comma separated values), TSV (tab separated values), DIF, XLS, XLSX, or the like. Other data sources may not be spreadsheets, e.g., text files with data in them. The data used in this process can come from any source 102, e.g., applications, databases, or local files. Data that has been formatted is described herein as a spreadsheet-formatted data set.

Next the data from the selected data sets is profiled 320 to identify data types and data domains for the plurality of columns of data values. The data profiling module 110, for example, uses inferences and data intelligence to understand data characteristics of the data sets. From this information, the data profiling module 110 can understand the data type and domains, number of rows and columns of data, how many of the values are unique and value frequencies, minimum and maximum length of the data in a column, etc. The profiled data for the data sets may be displayed to the user in a data information section of a user interface, e.g., via UI module 122.

Using the profile information, the data sets can be unified in various ways. For example, data sets with some overlap can have a combine or join function applied. In this example, one or more key columns are used to join one data set side by side with another data set(s) into a composite spreadsheet. An example of a combine function is discussed below in conjunction with FIGS. 5A-6. For data sets with multiple columns of overlap, the overlapping columns can be used to merge or perform a union function on the data sets, forming a composite spreadsheet with the rows of one of the original data sets below the rows of the other data set. An example of a merge function is discussed below in conjunction with FIGS. 7A-8B. In another example, a lookup function can be used to add column of data from one sheet, the lookup sheet, to another sheet that doesn't include that column. An example of a lookup function is discussed below in conjunction with FIGS. 9A-9B. According to one embodiment, the user selects the type of unifying action desired for creating the composite spreadsheet. According to another embodiment, the system automatically suggests or performs the appropriate unifying action based on the way in which the data between the data sets overlaps.

As a next step for unifying the two data sets, at least one matching column is identified 330 among the data sets selected. In some instances, only one column will overlap, in which case no selection needs to be made as to which column to use. In other circumstances, more than one column may match up between the data sets. In this case the system can display the overlap information to the user, along with information about the percentage overlap between the various columns that match up, and the user can select which to use for the unifying action. Thus, next the system calculates 340 a match metric for the at least one matching column. The match metric may spell out the percent overlap/match between the data sets for that column, or provide other data relating to how close of a match there is between the relevant data sets.

The method then unifies 350 the data sets into a single composite spreadsheet using the at least one identified matching column. As noted above, the unification may take different forms, namely join/combine (FIGS. 5A-6), union/merge (FIGS. 7A-8B), and lookup (FIGS. 9A-9B). The system also generates 360 a preview view of the composite spreadsheet, visually indicating the at least one matching column, any non-matching columns between the data sets, and the match metric for the matching columns. In one embodiment, the preview is generated when the user hovers or otherwise indicates a potential action to apply. However, the preview is only a view into what the data would look like if the action is committed, and can be undone simply by discontinuing the hover or other action.

Once the data is unified into a composite spreadsheet, further analysis of the unified data is done, e.g., via data profiling module 110, to identify further data type, domain, etc. information, including information about patterns, inconsistencies in data, value frequencies, etc. Using the profiled data, the system can suggest data refinements to the user, such as validating known data types (FIG. 13A), looking up data, resolving inconsistencies between data values (FIGS. 17A-17B), removing null values, splitting data values (FIGS. 13B, 14A-14B), enriching the data from other sources (FIG. 10), graphically displaying data (FIGS. 15, 16), etc. In addition, the entire procedure of unifying the data sets, applying actions, etc. is captured, e.g., by action history module 112, as further discussed in conjunction with FIGS. 11-12B. This allows the system to undo or redo any step, as well as refresh the procedure, thereby applying it to updated or otherwise different data.

Figure 4:
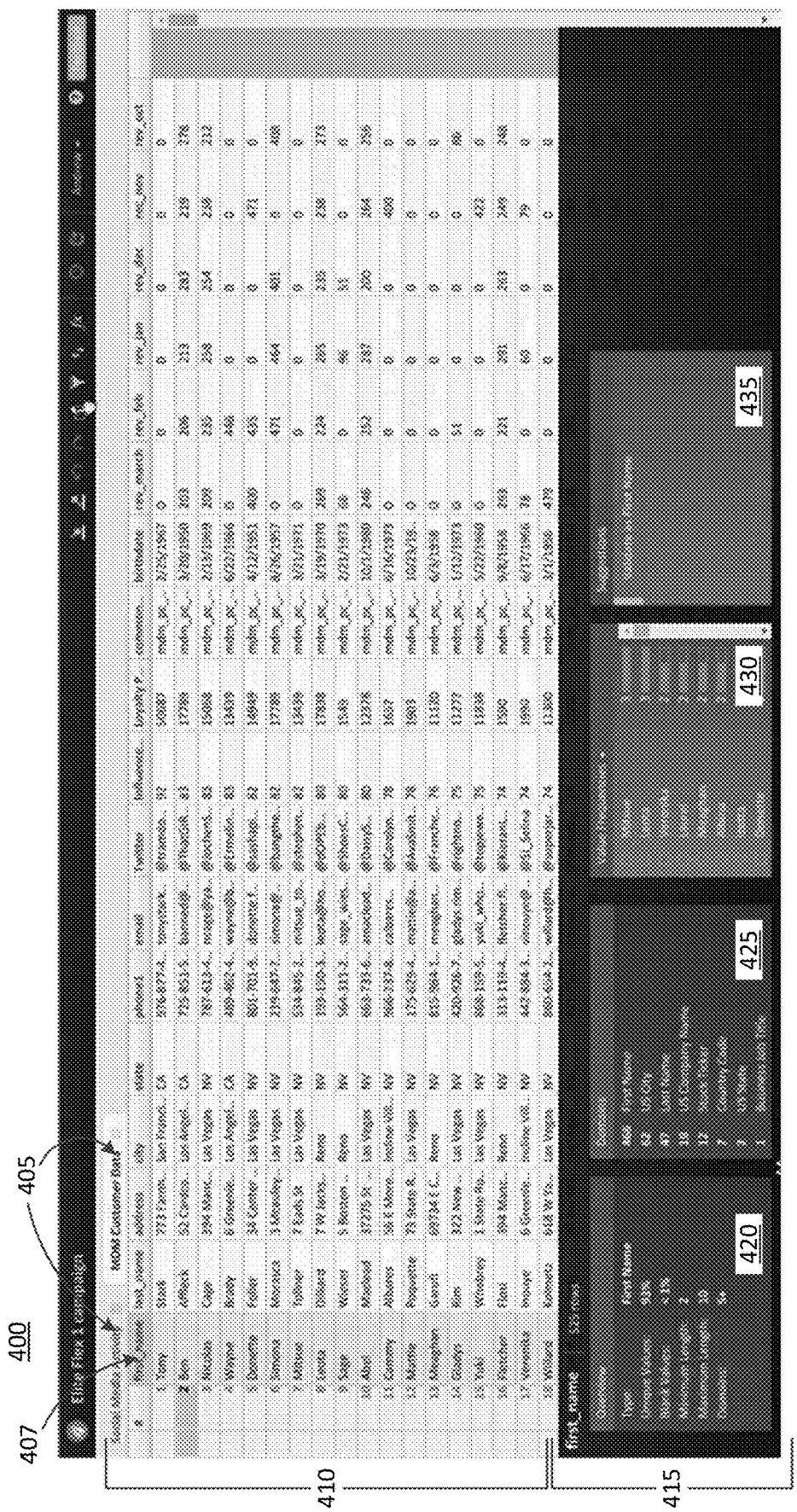
FIG. 4 illustrates an example of a user interface with summary column data according to one embodiment.

FIG. 4 illustrates an example of a user interface 400 according to one embodiment. The user interface 400 is populated with data extracted from one or more data sources, e.g., 102. As shown, the user interface 400 includes one or more spreadsheet-formatted data sets 405 in a data section 410 and various cards 420-435 in an information section 415. All of the data for the cards is obtained in the composite data previewing process described above. In this example, two spreadsheets 405 are shown, with the MDM Customer Data being the spreadsheet 405 currently displayed. The column "first name" 407 is selected. In the information section 415, an overview card 420 provides an information overview for the selected column (first name), such as the type, percentage of unique values, percentage of blank values, minimum length for names in the column, maximum length for names in the column, and number of domains. A domains card 425 includes information about all of the domains in the spreadsheet 405, and how many rows correspond to each domain. A value frequencies card 430 lists the frequencies of the values of the various names in the selected first name column 407, as well as how name times each of the names occurs. A suggestions card 435 provides the user with suggestions for correcting, enhancing, or otherwise augmenting the data, if any. In the example shown, the suggestion is verify as first name. The system uses the data profiling described above to help provide these intelligent suggestions to the user of the interface.

According to one embodiment, a user interface of a structured data manipulation system includes a data section, an information section, and various controls. The data section is for displaying the spreadsheets for analysis. The information section is for displaying profiled information about the spreadsheets. A composite data control is for receiving a command to unify the spreadsheets into a composite spreadsheet based on at least one matching column among the spreadsheets. The composite data control may be multiple different controls for the various unifying actions. One the composite spreadsheet is formed, the data section further includes a preview of the composite spreadsheet, showing the matching column(s) and the non-overlapping columns between the spreadsheets. In addition, the information section includes a match metric calculated for the composite spreadsheet that shows the how well matched the spreadsheets are.

A user interface with data focus includes intelligence, e.g., in the form of domain specific knowledge, heuristics, and learning models, to select keys and present them in place of data, show the number of rows after a data join in place and enable a user modify the join condition. The UI provides a visual distinction between rows that matched and rows that did not match. Specific examples of the various user interfaces follow.

Combine/Join

Figure 5A:
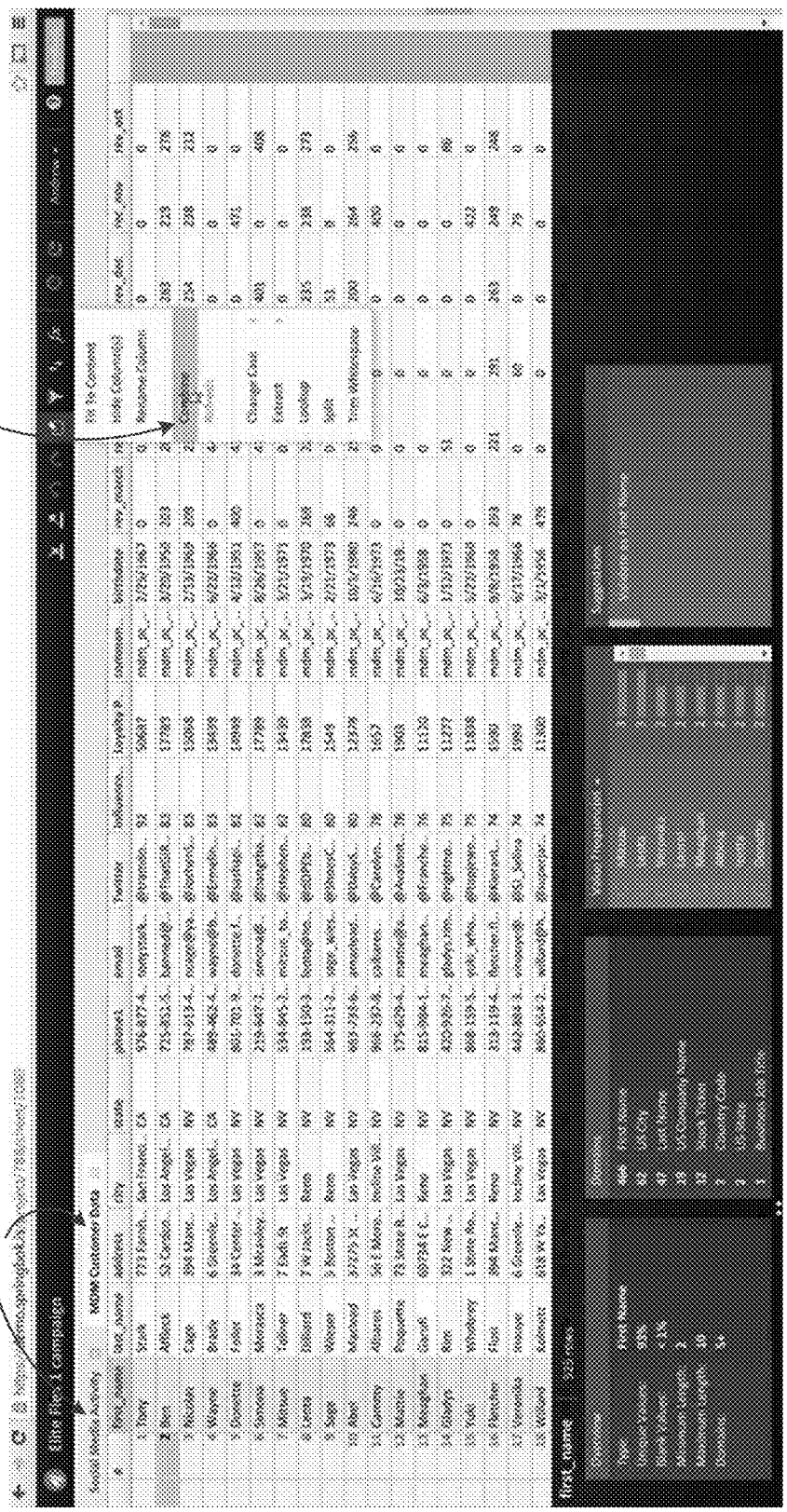
FIG. 5A illustrates an example of a user interface in which a user is selecting a combine function according to one embodiment.

FIG. 5A illustrates an example of the user interface 400 of FIG. 4 in which a user is selecting a combine function via drop down 510 according to one embodiment. This function will result in the system combing the two spreadsheet-formatted data sets 405.

FIG. 5B illustrates an example of a user interface 500 during the process of a combine function according to one embodiment. A third spreadsheet 505 is added to the data section 510, called "combination 3" that shows the data combined between the two sheets. For making the combine, the system automatically profiles all of the information in every single column between the two sheets and identifies the columns that have the highest degree of overlap. In the information section 515, overlapping keys between the data sheets are automatically identified and provided for selection by the user. Here, the two options for key columns are "username" with a very high percentage overlap, and klout score, with about a 75% overlap.

Figure 5C:
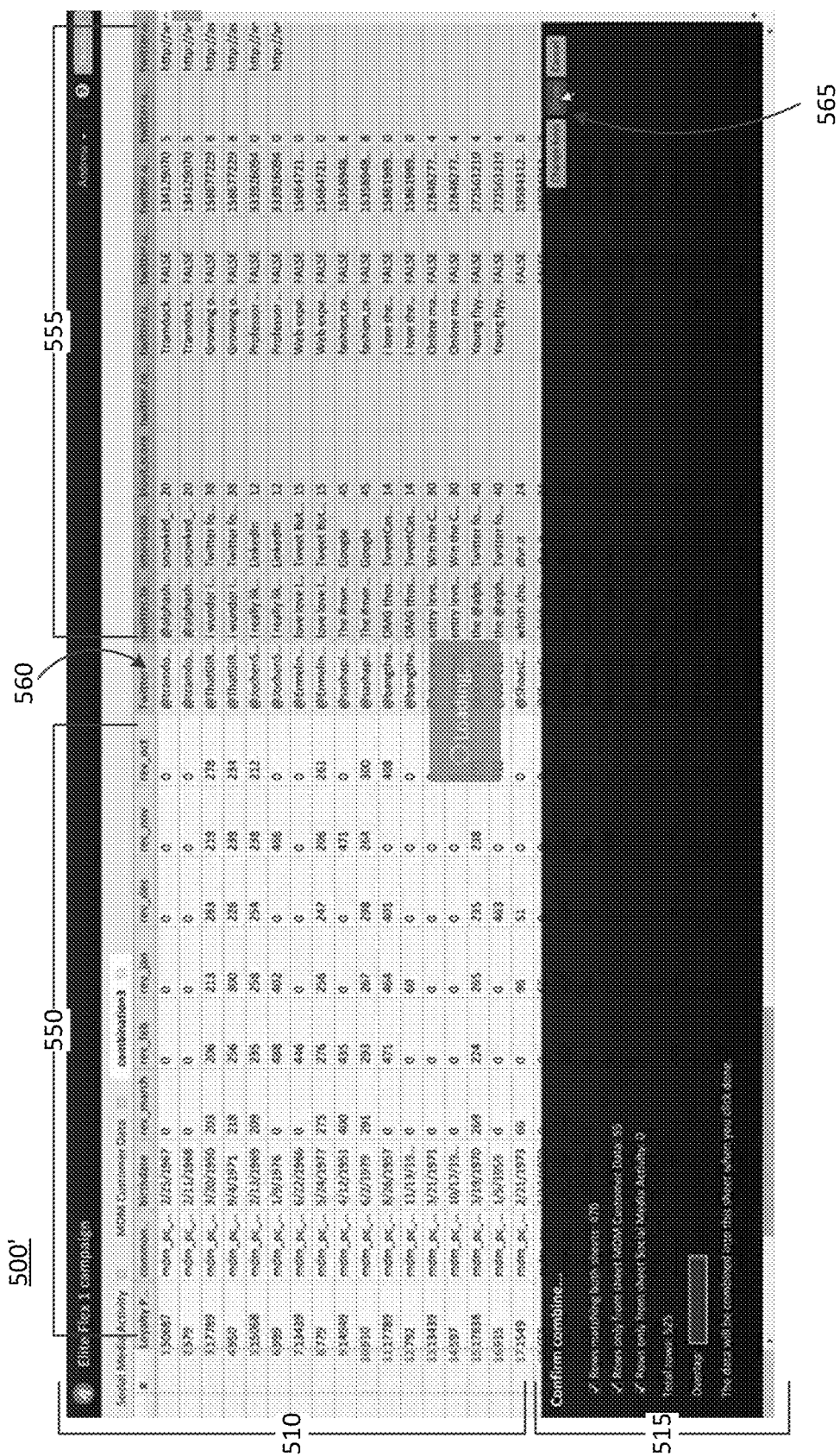
FIG. 5C illustrates an example of a user interface during the process of applying a combine function according to one embodiment.

FIG. 5C illustrates an example of a user interface 500' during the process of applying a combine function according to one embodiment. In this example, the data section 510 shows the combined data, with the data from one sheet on one side 550, the data from the other sheet on the other side 555, and the key column common to them ("Twitter") in the middle 560. The information section 515 shows information about the combine in progress: how many rows match versus are unique to one sheet or the other, the total number of rows, and the percentage overlap. Selection of Done button 565 commits the combination a shown in the preview.

Figure 6:
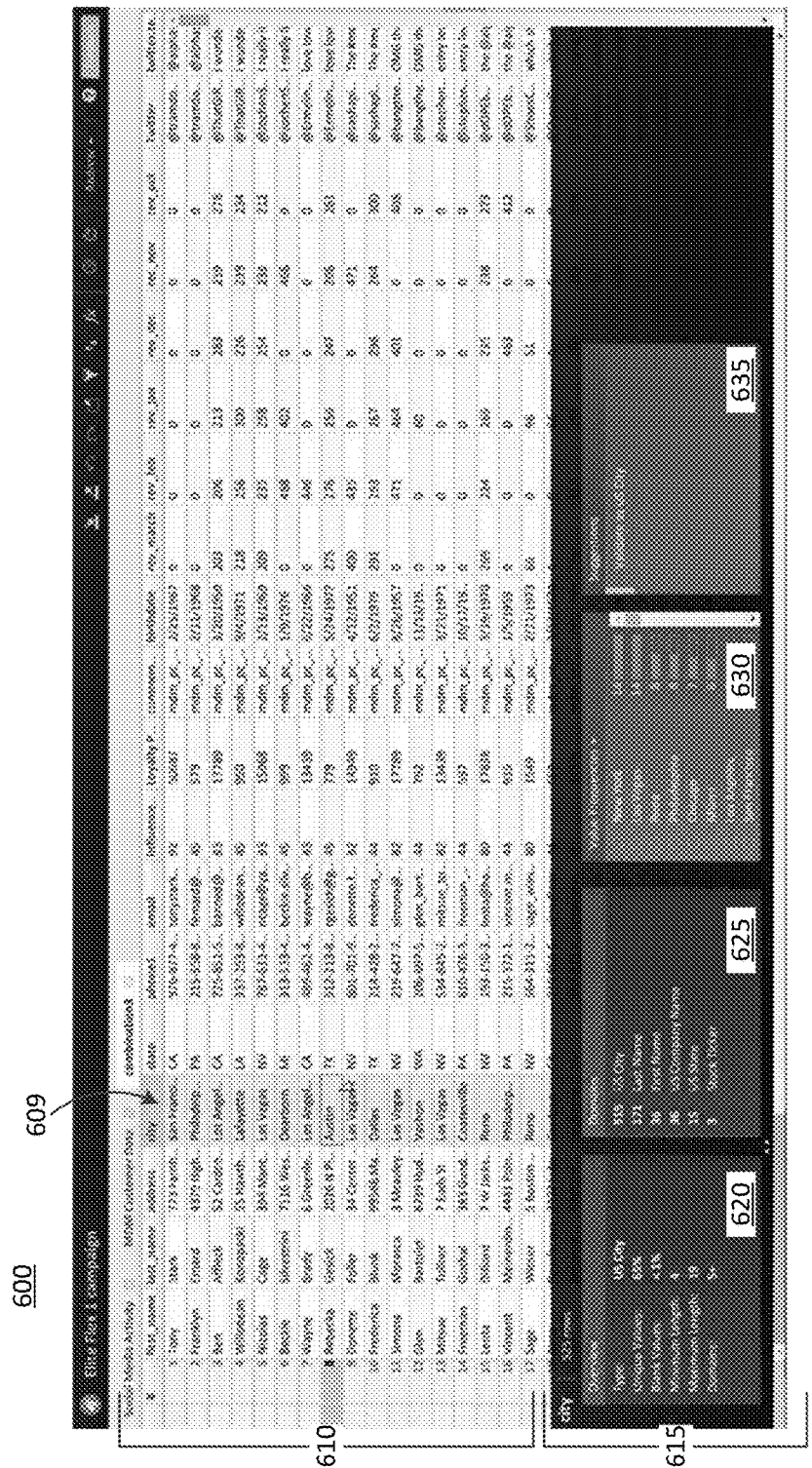
FIG. 6 illustrates an example of a user interface following a combine function according to one embodiment.

FIG. 6 illustrates an example of a user interface 600 following a combine function according to one embodiment. In this example, combination 3 sheet 605 shows the city column 609 as selected in the data section 610. The information section 615 shows cards 620-635, which show information for the combined sheet, including an overview of the selected column (620), all the domains in the combined sheet (625), the value frequencies of the cities in the city column (630), and suggestions (635) for modifying the data, if any.

Union/Merge

FIG. 7A illustrates an example of a user interface 700 according to one embodiment. The user interface 700 is populated with data extracted from one or more data sources, e.g., 102. As shown, the user interface 700 includes one or more spreadsheet-formatted data sets 705 in a data section 710 and an information section 715 displaying summary information. All of the data for the cards is obtained in the composite data previewing process described above. In this example, two spreadsheets 705 are shown prior to a union function, with contacts.csv being the spreadsheet 705 currently displayed. Since no column is selected, in the information section 715, an overview 721 shows the name of the source, the total number of rows (498) and the total number of columns (12). A graphical overview 726.

Figure 7B:
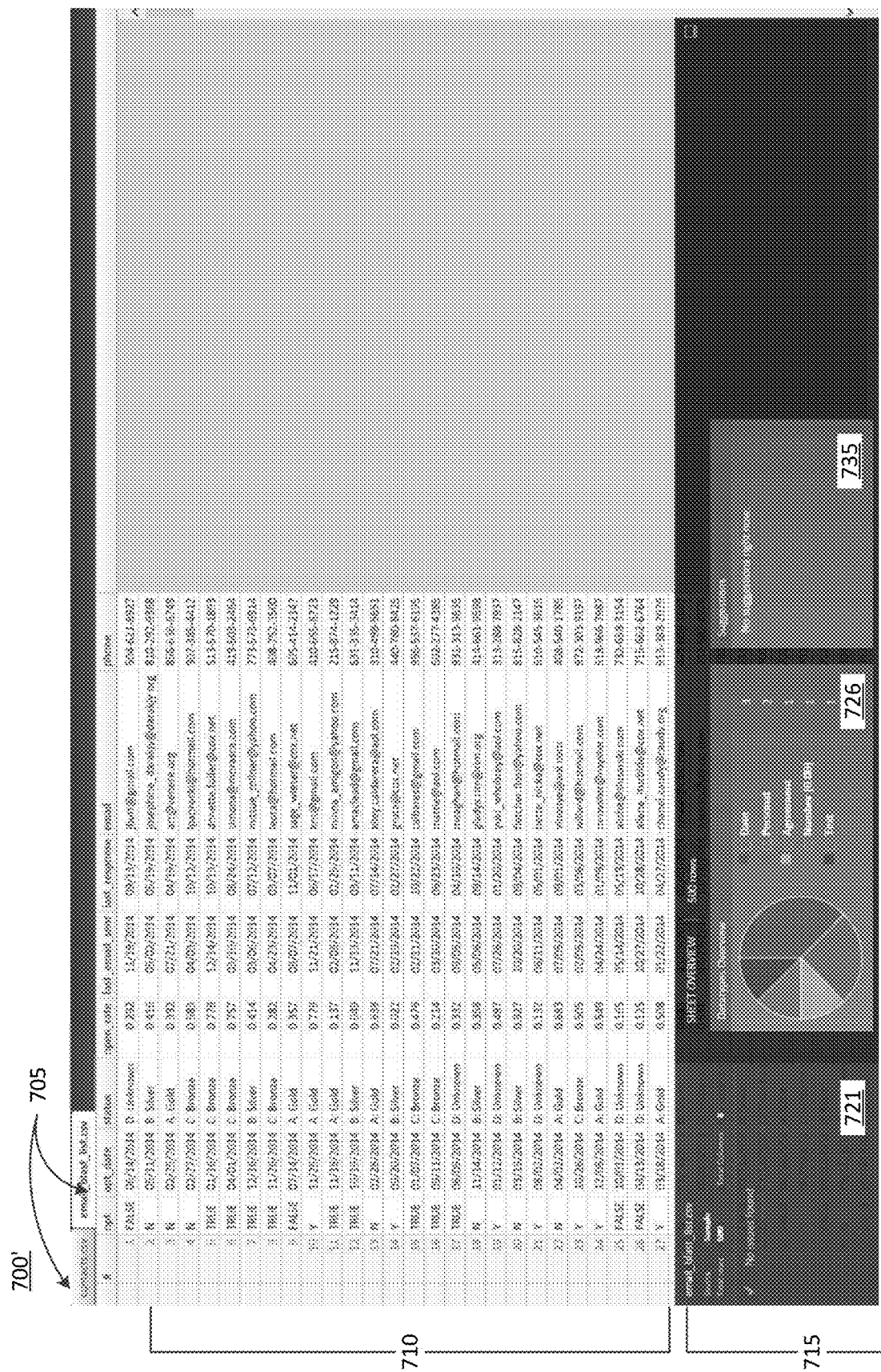
FIG. 7B illustrates an example of a user interface prior to a union function according to one embodiment.

FIG. 7B illustrates an example of a user interface 700' according to one embodiment, which is similar to FIG. 7A but for a different spreadsheet-formatted data set prior to the union function. As shown, the user interface 700' has two spreadsheets 705, with email blast list.csv being the spreadsheet 705 currently displayed. Since no column is selected, in the information section 715, an overview 721 shows the name of the source, the total number of rows (550) and the total number of columns (8).

Figure 8A:
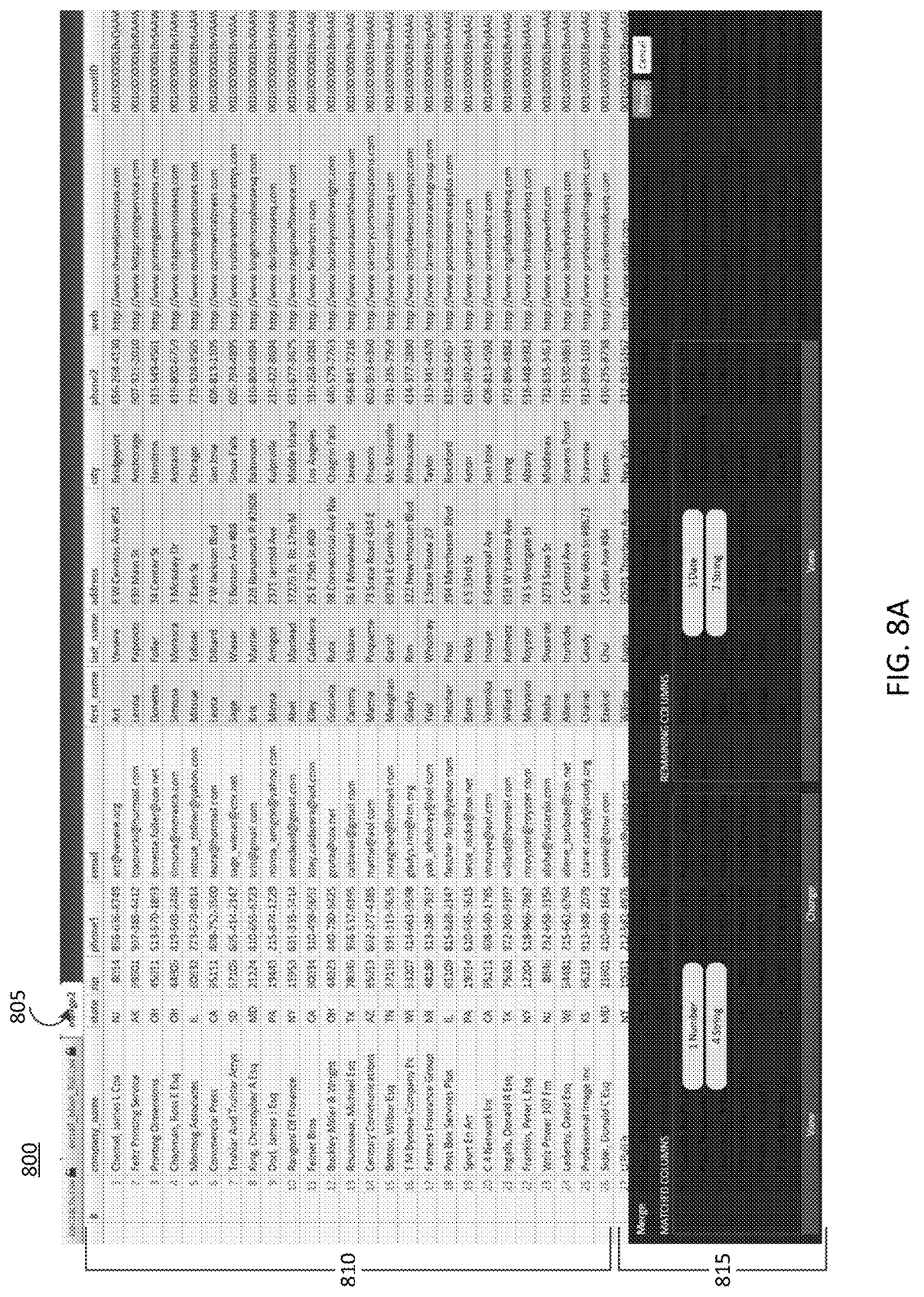

FIG. 8A illustrates an example of a user interface 800 during the process of a merge function according to one embodiment. A third spreadsheet 805 is added to the data section 810, called "merge 2" that shows the data merged between the two sheets. For the merge, the system automatically profiles all of the information in every single column between the two sheets and identifies matching and non-matching columns, as shown in information section 815. Here, there are five matching columns, 1 number and 4 string (left side columns), and 10 unmatched columns, 3 date and 7 string (right side columns).

Figure 8B:
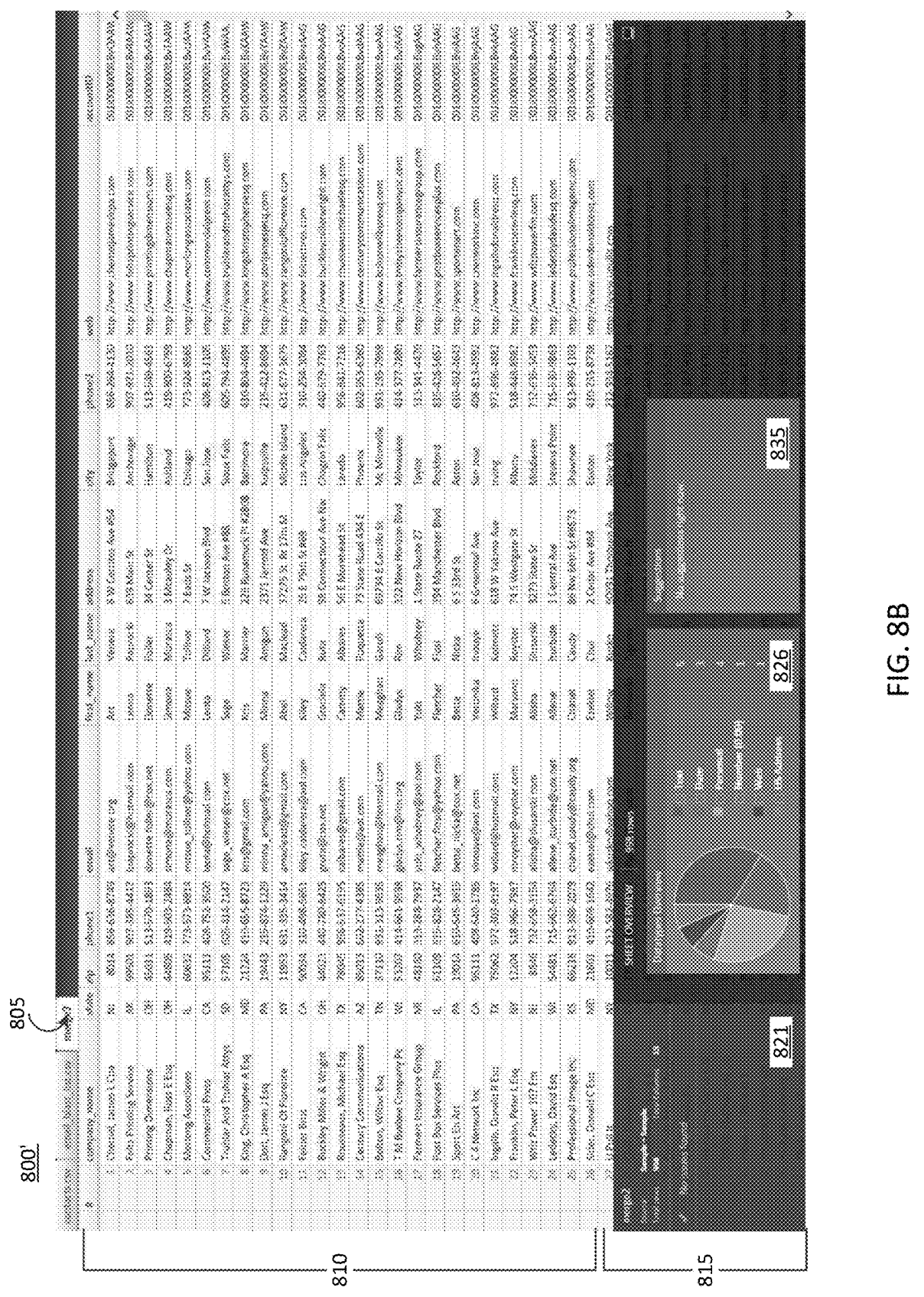

FIG. 8B illustrates an example of a user interface 800' following the merge function according to one embodiment. A third spreadsheet 805 now shows the merged data between the two sheets. As a result of the merge, the information section 815, now shows an overview 821 with the merged names of the sources, the total number of rows (990=498+550) and the total number of columns (15).

Lookup

FIG. 9A illustrates an example of a user interface 900 during the process of a lookup function according to one embodiment. In an information section 915, the user is selecting information for a lookup function. In the first portion 922, the user selects which of the spreadsheet-formatted data sets 905 should be used for the lookup. Here, the user has selected email blast list.csv. Next, in the second section 927 the user selects a key column for the lookup. Here, the user has selected the email column. Per these selections, the email blast list.csv spreadsheet is shown in the data section 910 and the email column 909 is highlighted or otherwise visually distinguished. Finally, the third section 937 allows the user to select a column to add from the lookup sheet. Here, and the user has selected "opt," which has been added as an opt column 911 to the data section.

FIG. 9B illustrates an example of a user interface 900' following addition of a lookup column 911 according to one embodiment. In this example, opt column 911 is selected in the data section 910. The information section 915 shows cards 921-935, which show information for the sheet including the lookup column information, including an overview of the selected (lookup column) (920), the data overview for the opt column (926), the value frequencies of the cities in the opt column (930), and suggestions (935) for modifying the data, if any. In this example, the suggestion shown is to validate as agreement the data frequencies since they currently have both Y/N and TRUE/FALSE values, which will be discussed further in conjunction with FIGS. 17A-17B.

Figure 10:
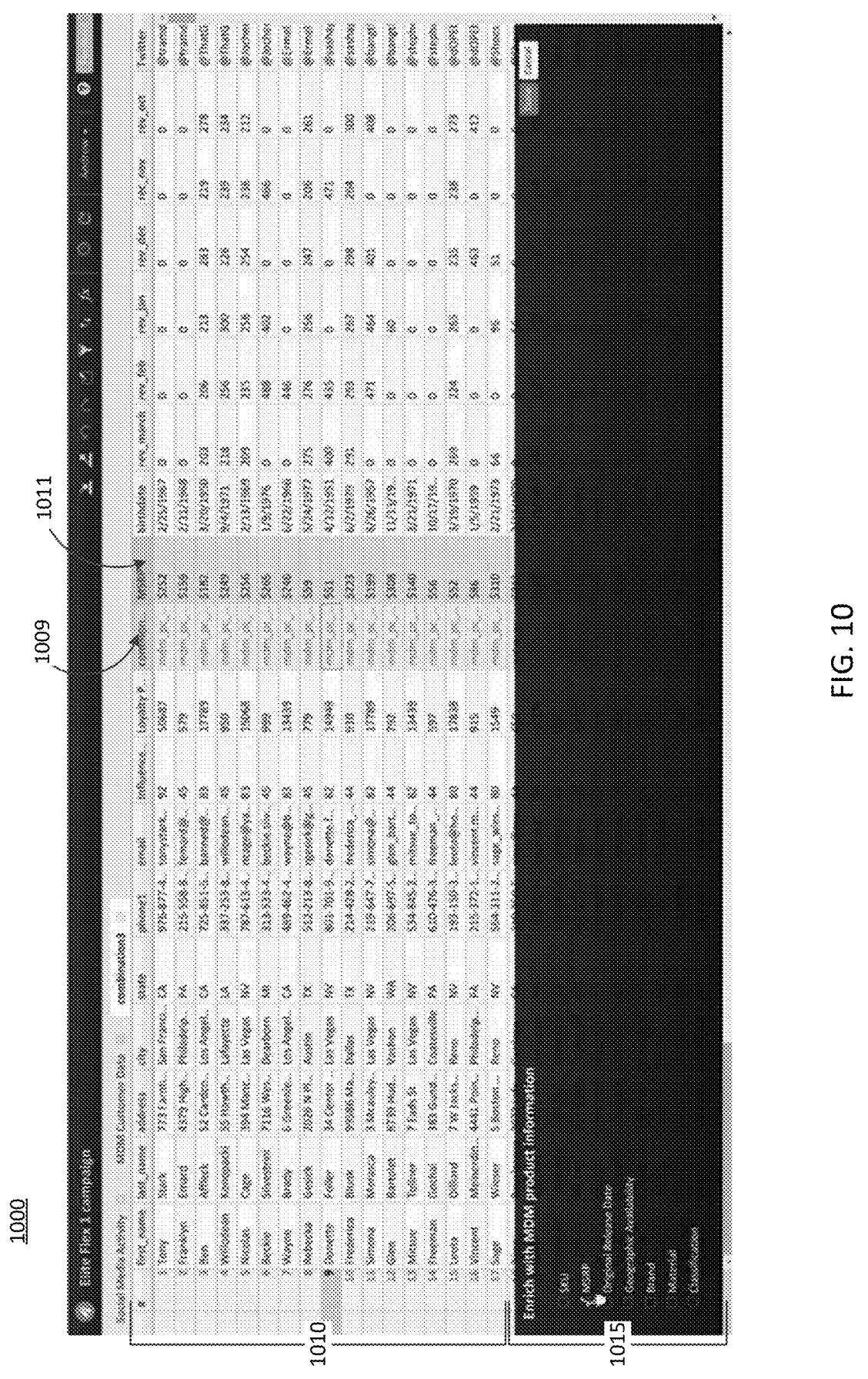

FIG. 10 illustrates an example of a user interface 1000 during the process of applying data enrichment as a result of a suggestion according to one embodiment. In a data section 1010, a row of common product numbers column 1009 has been selected, and a selection made to enrich the data with data from a related but separate source. Because the system has profiled other data related to product information, it provides a list of possible additional data to enrich with that is known by the system to be related to the product information. In an information section 1015, the displayed options for enrichment data are SKU, MSRP, Original Release Date, Geographic Availability, Brand, Material, and Classification. The user has selected MSRP, and as a result an additional column 1011 has been added in the data section 1010 for the MSRP corresponding to the various products.

Figure 11:
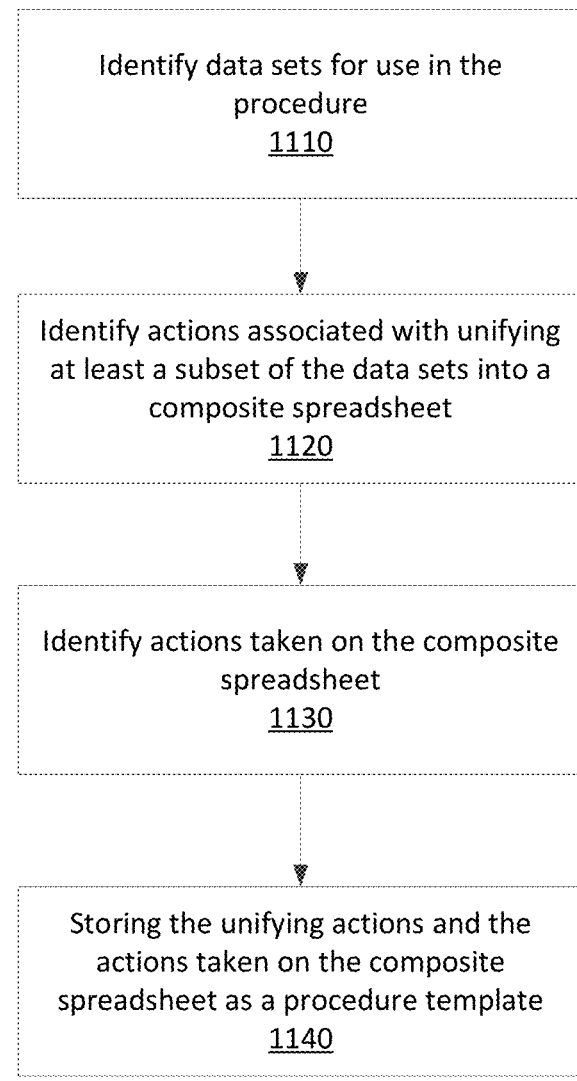
FIG. 11 is a flowchart illustrating a method of creating a reusable procedure template according to one embodiment.

FIG. 11 is a flowchart illustrating a method of creating a reusable procedure template according to one embodiment. The reusable procedure template can be reused to run the same procedures on different data. The method begins by identifying 1110 spreadsheets or spreadsheet-formatted data sets for use in the procedure. The user may select the various data sets to use, and the action history module 112 tracks the data sets used. The procedure can be considered analogous to a recipe. In this analogy, the spreadsheets identified are the ingredients in the recipe. Optionally, actions can be taken on the individual spreadsheets at this stage. For example, if data clean-up was needed or desired for a spreadsheet, that action could be applied and would be tracked by the history module 112.

Figure 12A:
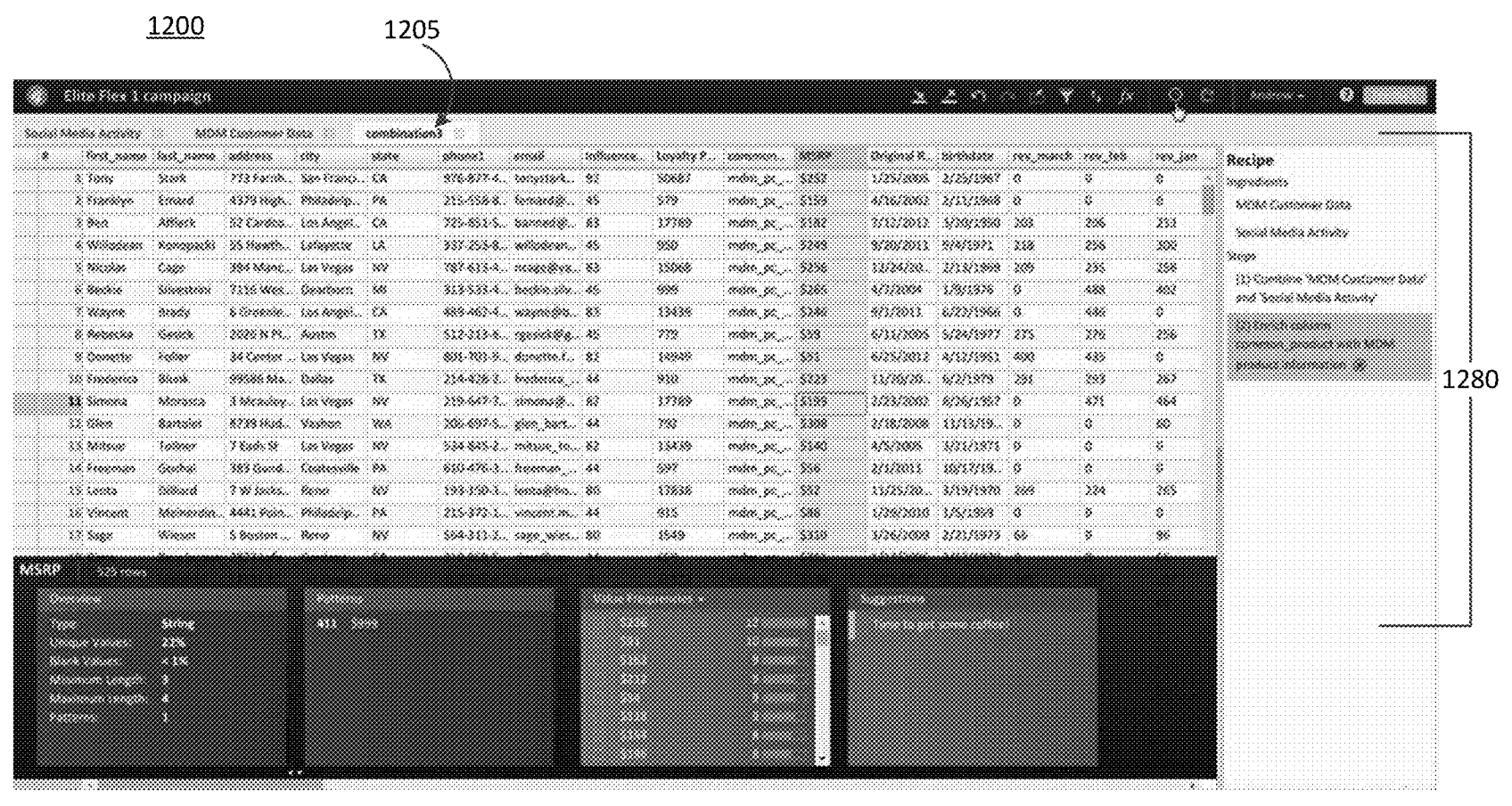
Figure 12B:
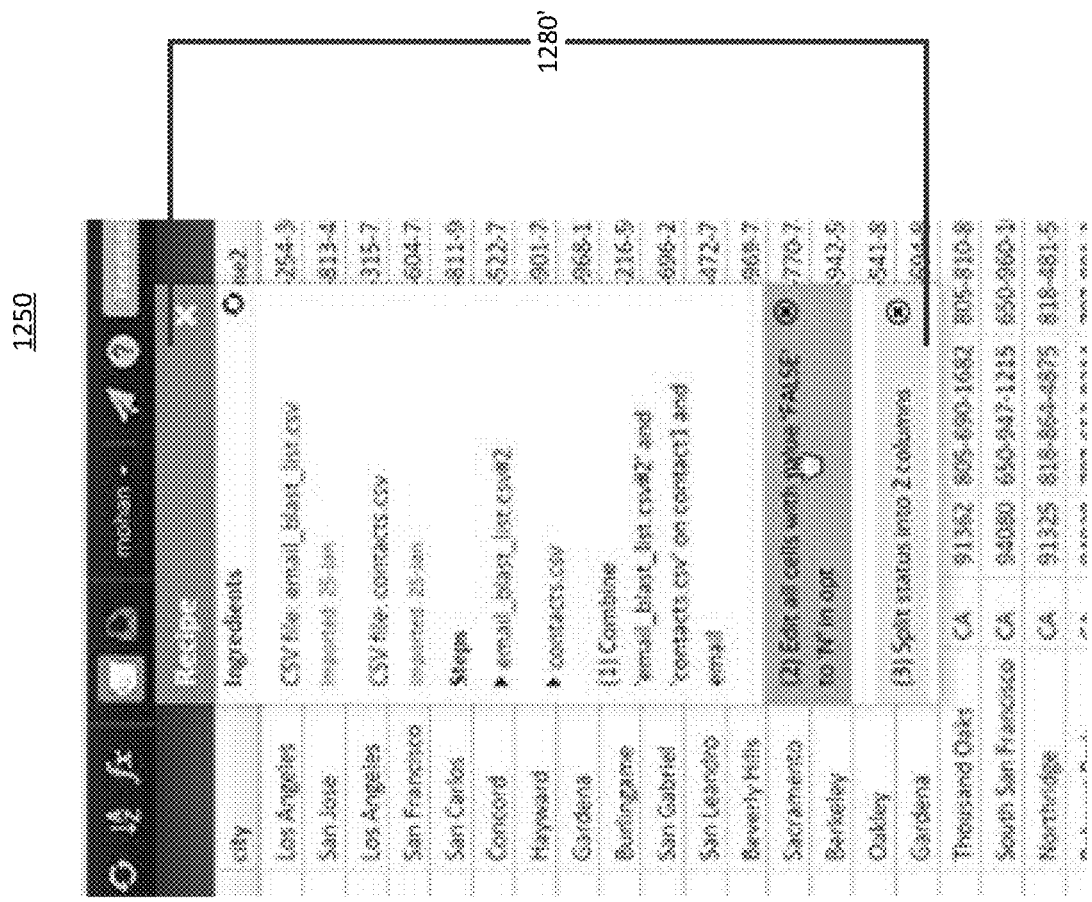
FIG. 12B illustrates an example of a user interface with a history of all actions taken on spreadsheets according to one embodiment.

Next, actions are identified 1120 associated with unifying at least a subset of the spreadsheets into a composite spreadsheet. These are analogous to the steps in the recipe, i.e., what you do with the ingredients. For example, any of the actions described above for unifying spreadsheets: combine, merge, or lookup, can be identified in this step. Again, the action history module 112 tracks the actions applied to the spreadsheets. The actions taken on the composite spreadsheet also are identified 1130. Many different actions can be taken on the composite spreadsheet, many of which are shown in the various user interface figures herein. For example, data refinements such as validating known data types, looking up data, resolving inconsistencies between data values, removing null values, splitting data values, enriching the data from other sources, graphically displaying data, etc. Then the unifying actions and the actions taken on the composite spreadsheet are stored 1140 as a procedure template that can be applied to a plurality of other spreadsheets. Thus, the entire procedure of unifying the spreadsheets, applying actions, etc. is captured, e.g., by action history module 112. This allows the system to undo or redo any of the actions individually or as a group. In addition, the full set of procedures can be refreshed with different data. For example, if customer and email lists from January were used to initially combine the spreadsheets, split one column, and enrich data with an added column, the system could refresh the data for the February customer and email lists for February and automatically repeat all of the steps of the procedure with the new/updated data. FIGS. 12A-12B below illustrate examples of reusable procedure templates, or "recipes."

FIG. 12A illustrates an example of a user interface 1200 with a history of all actions taken on the spreadsheet-formatted data sets 1205 in a recipe section 1280 according to one embodiment. All of the manipulations performed by the user are stored in this history list. The user can see all of the changes that have been made, and the history allows the user to undo or redo all of these same actions, or repeat them for similar datasets. The history also allows the system to mine the applied operations to help create improved suggestions. In this example, the ingredients are the original starting sheets (e.g., 405 from FIG. 4) and the steps are to combine the sheets as was shown in FIGS. 5A-5C, and then a data enrichment/lookup function as described in conjunction with FIGS. 9A and 9B.

Figure 14A:
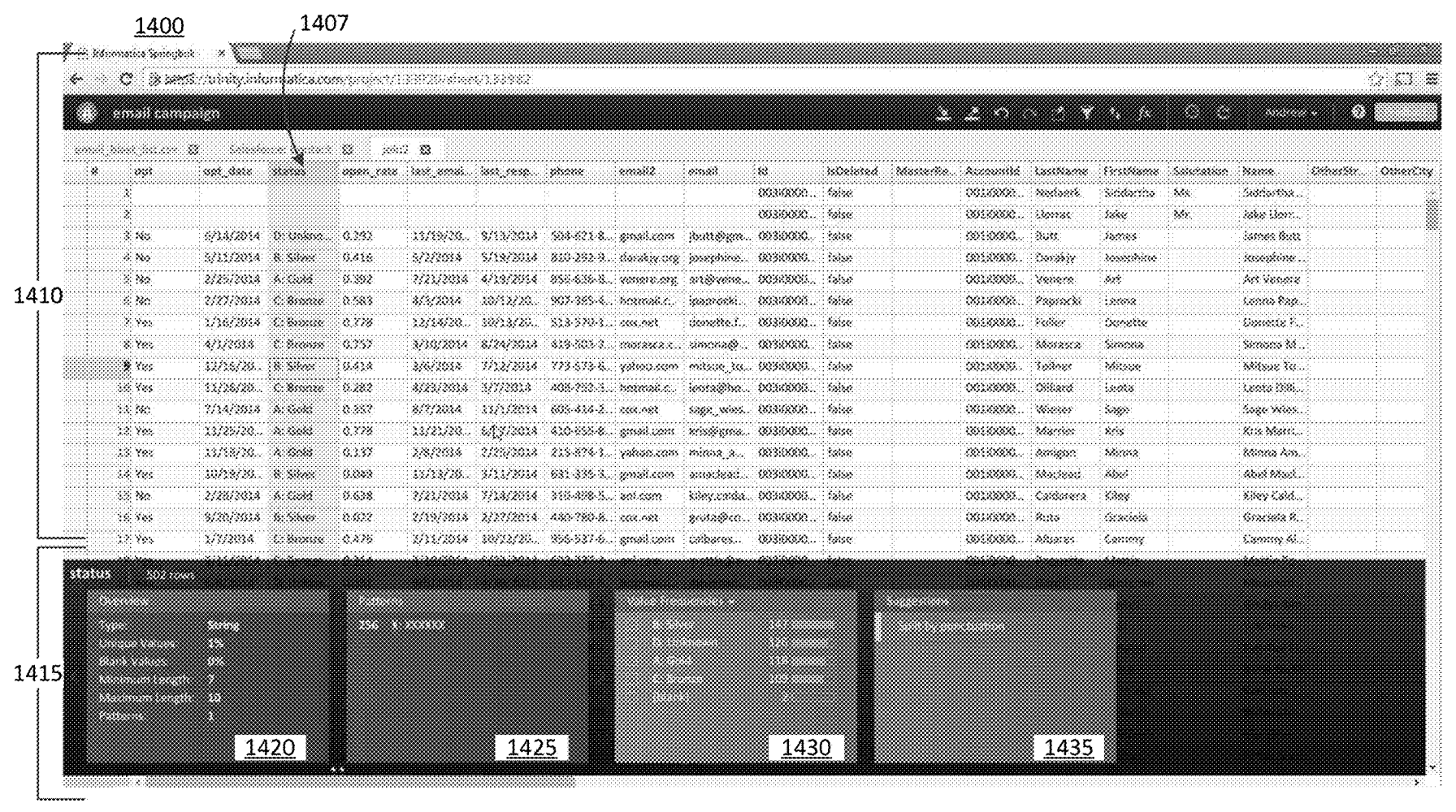
Figure 14B:
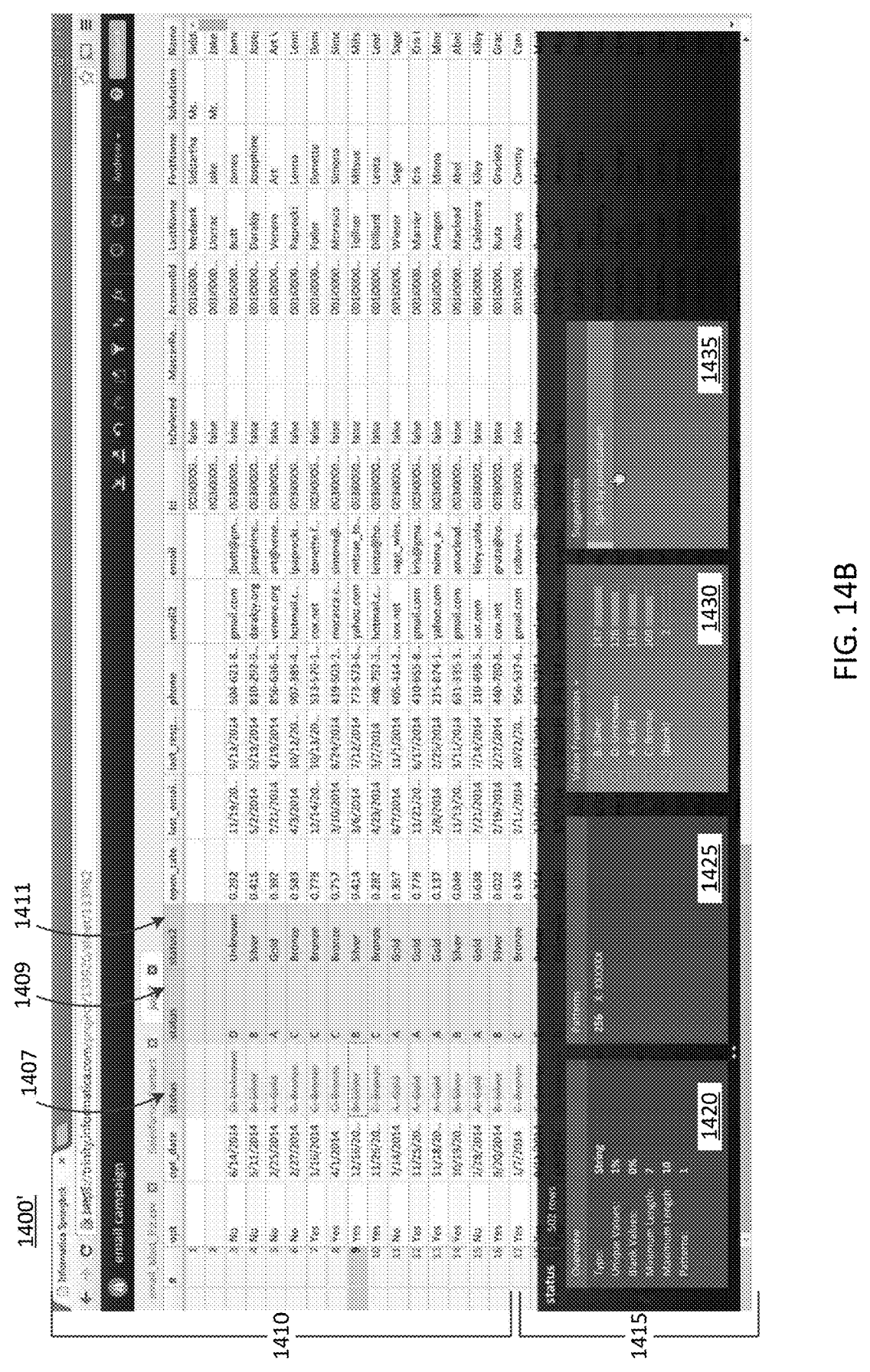

FIG. 12B illustrates an example of a user interface 1250 with a history of all actions taken on the spreadsheet-formatted data sets in a recipe section 1280' according to one embodiment. In this example, two sheets email blast list and contacts have been combined, cells have been edited to replace FALSE values with N values (FIGS. 17A, 17B), and the status column split (FIGS. 14A, 14B).

Figure 13A:
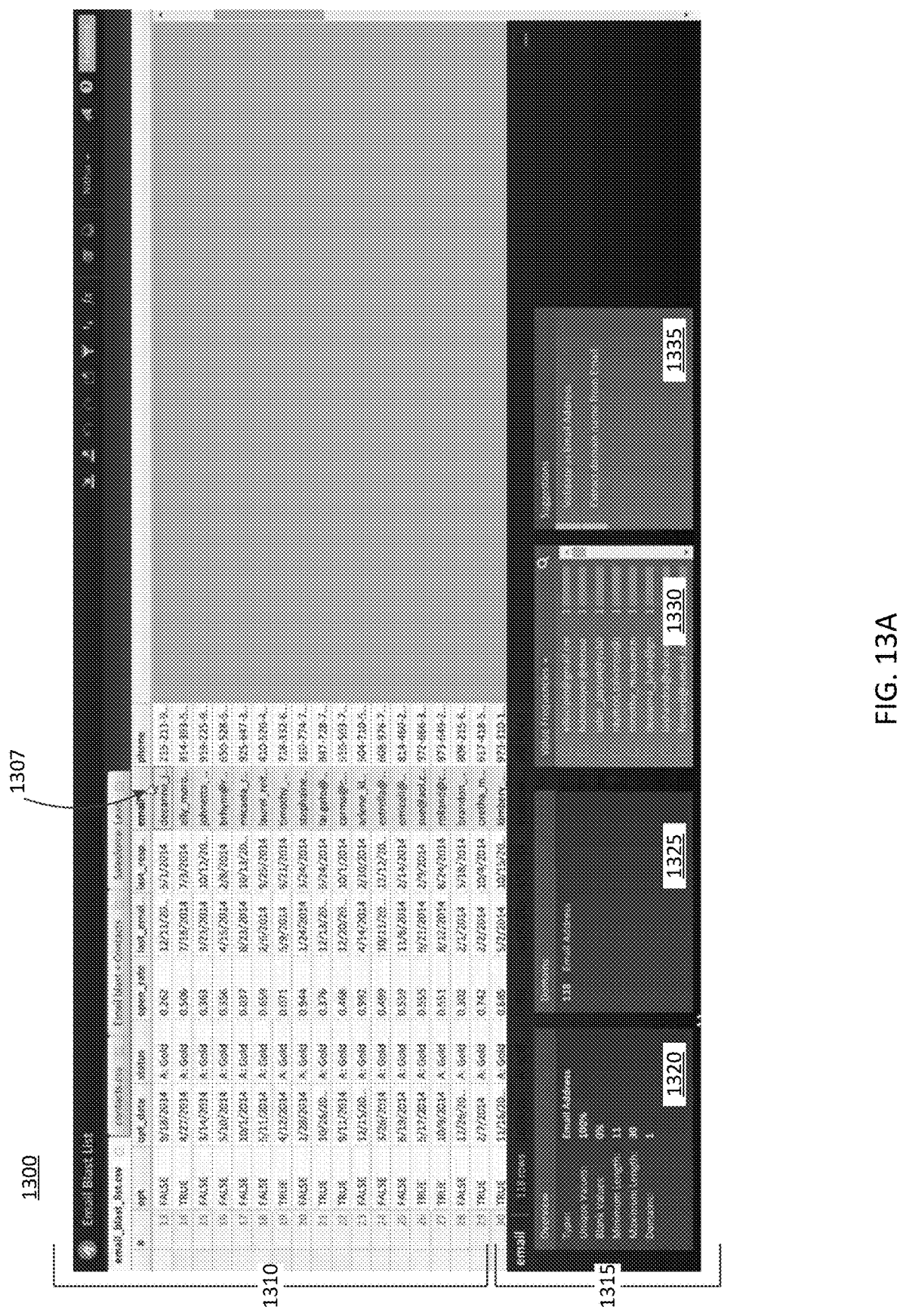
Figure 13C:
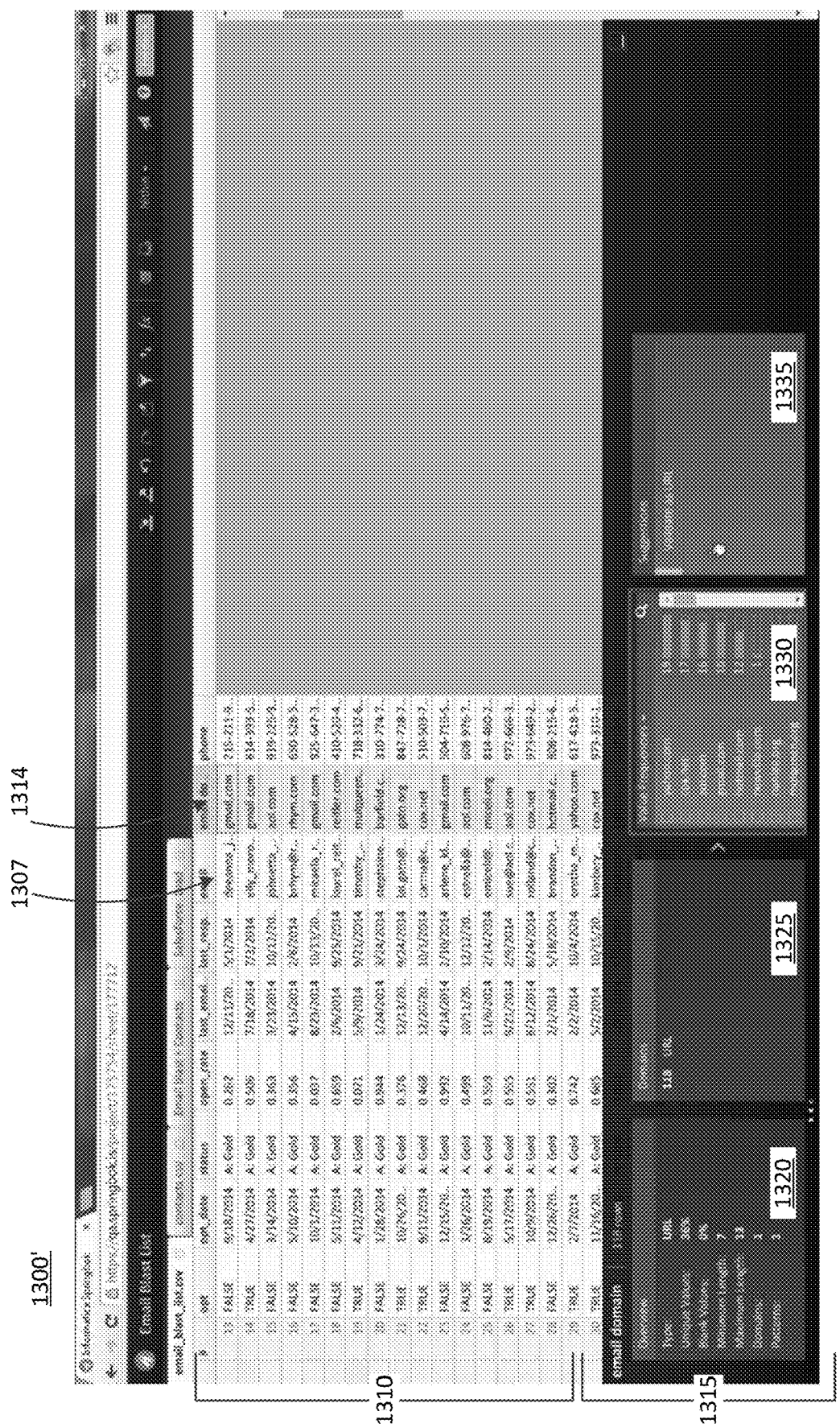
FIG. 13C shows an example of a user interface showing application of a system suggestion according to one embodiment.

FIGS. 13A-13C show an example of a user interface 1300 showing application of a system suggestion according to one embodiment. In FIG. 13A, the user wants to look more closely at email addresses, and thus has selected email column 1307 in data section 1310. As before, the information section 1315 displayed the profiled data related to the column 1307. For emails, the system has built-in intelligence. As shown, a summary for emails lists that for the email column all 118 are email addresses, and they're all unique. There are no blanks and the maximum email length is 30 characters. The information section 1315 includes this information in an overview card 1320 showing all unique and no blank values among the email addresses. The information section 1315 also includes a domain card 1325 showing a single domain for the column, a value frequency card 1330 showing a frequency of one for each email address, and a suggestions card 1335 listing two suggestions: validate as email and extract domain name form email.

In FIG. 13B, the user hovers over the Validate as email suggestion option in suggestions card 1335, and a preview view is shown in data section 1310 that adds to the data an email validation column 1313. If the user clicks the preview commits and the suggestion is applied, whereas if the user stops hovering over the suggestion, the preview view disappears and the data reverts to the prior state. If the user then decided to hover over the Extract domain name from email suggestion, a preview view showing a new email domain column 1314 would display in the data section 1310 that includes only the domain name extracted from the email address.

FIG. 13C shows the user interface 1300' result after the user clicks on the Extract as domain name from email suggestion and the suggestion is applied, showing new column email domain 1314. In this example, the user has selected the email domain column 1314, and the information section 1315 thus now shows information corresponding to that column, including overview 1320, domains 1325, value frequencies 1330 (now showing frequencies of domains), and suggestions 1335 (now showing a suggestion to validate the domain as a URL).

FIGS. 14A-14B show an example of a user interface 1400 showing application of a system suggestion according to one embodiment. In this example, the user has selected lead status 1407 at the column of interest. A user reporting on status may not want to see the unknown, silver, gold, bronze with codes A, B, C, D in front of each. Because the system has profiled the information, it has identified that there's a punctuation mark and thus the column is a good candidate for splitting. In this example, the system may have a rule (again, which can be enterprise specific, industry specific, learned, etc.) that punctuation within a field provides a good candidate for splitting (another example may be Last, First, which could be split at the comma into two columns—Last and First). In the suggestion card 1435 of the information section 1415 the suggestion is Split by punctuation.

As above, the user can hover over the option and see a preview view of the split, as shown in the user interface 1400' of FIG. 14B. In this example, the preview view in the data section 1410 shows that the status column 1407 will be split into two columns 1409, 1411, one with the letter A-D, and one with the text description, and the former column 1407 will be deleted.

Figure 15:
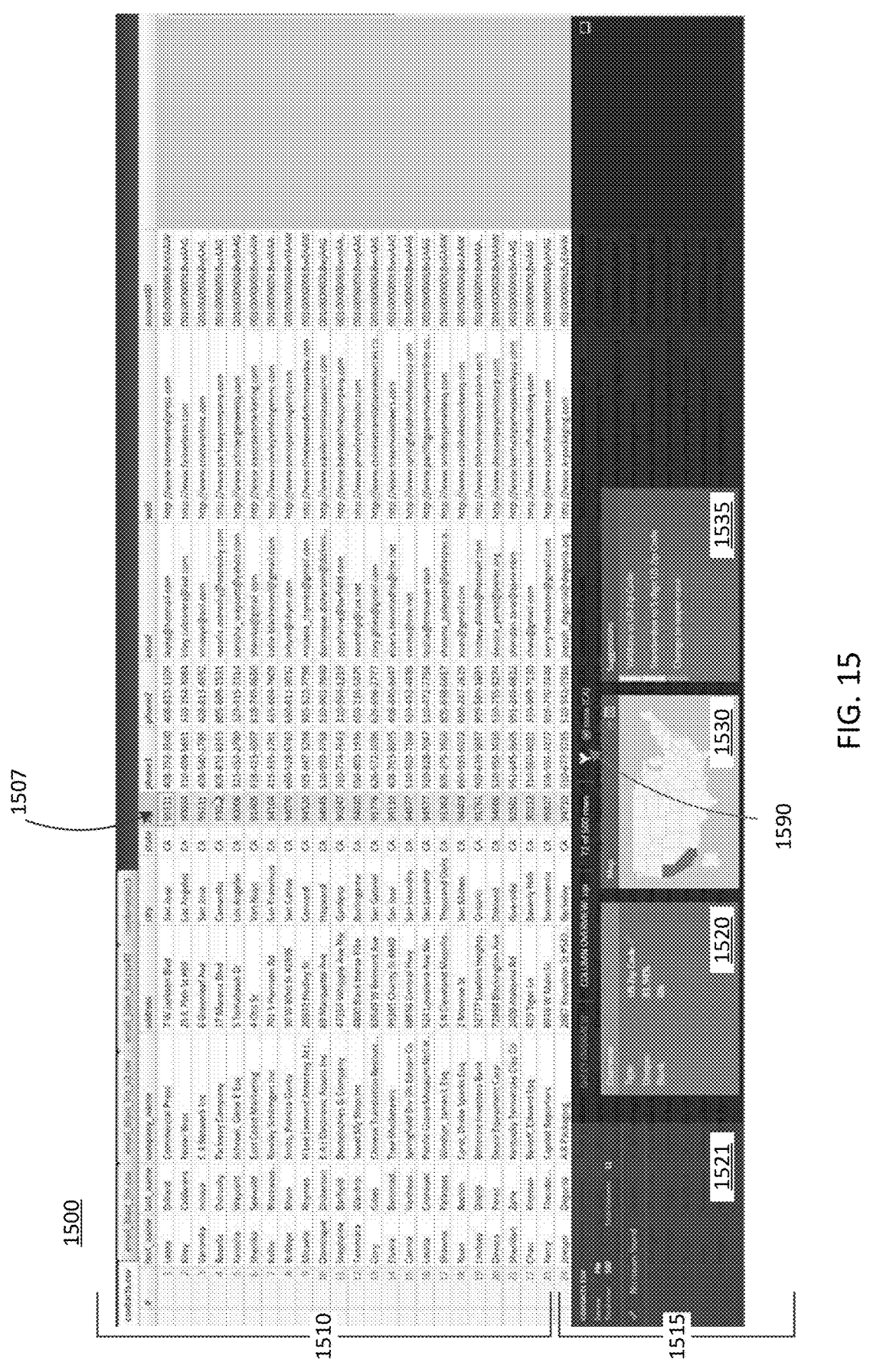

FIG. 15 shows an example of a user interface 1500 with a graphical representation of column data 1530 according to one embodiment. In this example, the user has selected zip code 1507 as the column of interest in the data section 1510. Upon that selection, the graphical representation of the column data 1530 appeared in the information section 1515, showing graphically the zip codes corresponding to the various states. The graphical representation of the column data 1530 is interactive according to one embodiment. As shown in FIG. 15, the user has clicked on the state of California on the graphical representation of the column data 1530, which added a filter (shown at 1590) to narrow the zip codes in column 1507 to only those in California. In this way, the graphical representation of the column data 1530 allows the user to interact with the data directly via the graphical representation 1530 itself. The information section 1515 continues to show overview data 1520, 1521 and suggestions 1535. For example, for zip codes the system understands that the column includes US zip codes and offers suggestions including validation of the codes as actual US zip codes, as well as standardizing to five digits, e.g., for East coast addresses where a leading zero might get dropped due to automatic spreadsheet formatting.

Figure 16:
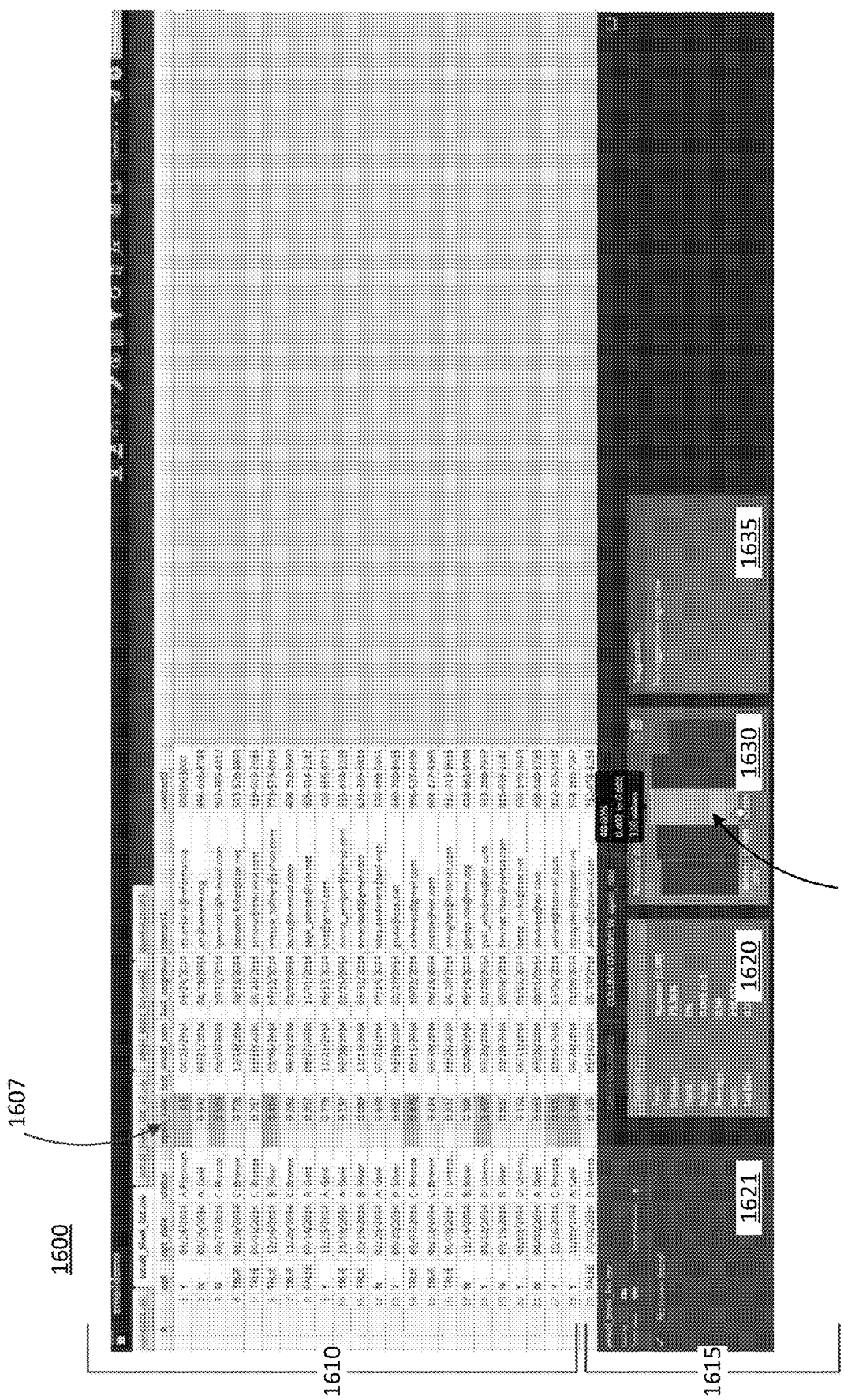
FIG. 16 shows an example of a user interface with a graphical representation of column data according to one embodiment.

Similarly, FIG. 16 shows an example of a user interface 1600 with a graphical representation of column data 1630 according to one embodiment. In this example, the user has selected open rate 1607 as the column of interest in the data section 1610. Upon that selection, the graphical representation of the column data 1630 appeared in the information section 1615, showing graphically the open rates by each 20% (bottom 20%, 20-40%, etc.) for the open rate data. The graphical representation of the column data 1630 is interactive according to one embodiment. As shown in FIG. 16, the user has clicked on the 40-60% rate bar (1695) on the graphical representation of the column data 1630, which caused the rows in column 1607 in the data section 1610 to be visually distinguished for easy identification. In this way, the graphical representation of the column data 1630 allows the user to interact with the data directly via the graphical representation 1630 itself. The information section 1615 continues to show overview data 1620, 1621 and suggestions 1635.

Returning briefly to FIG. 9B, the value frequencies card 930 shows four values for the Opt column 911: N, FALSE, Y, and TRUE. This graphical representation of the column data 930 allows the user to interact with the data directly via the graphical representation 930 itself.

FIG. 17A shows an example of a user interface 1700 in which a user is interacting with the graphical representation of column data 930 corresponding to column 911 of FIG. 9B according to one embodiment. In this example, the system has recommended standardizing the four options (N, FALSE, Y, TRUE) to two options. A shown the user is changing the second value (FALSE) in value frequencies card 930 to value N.

Figure 17C:
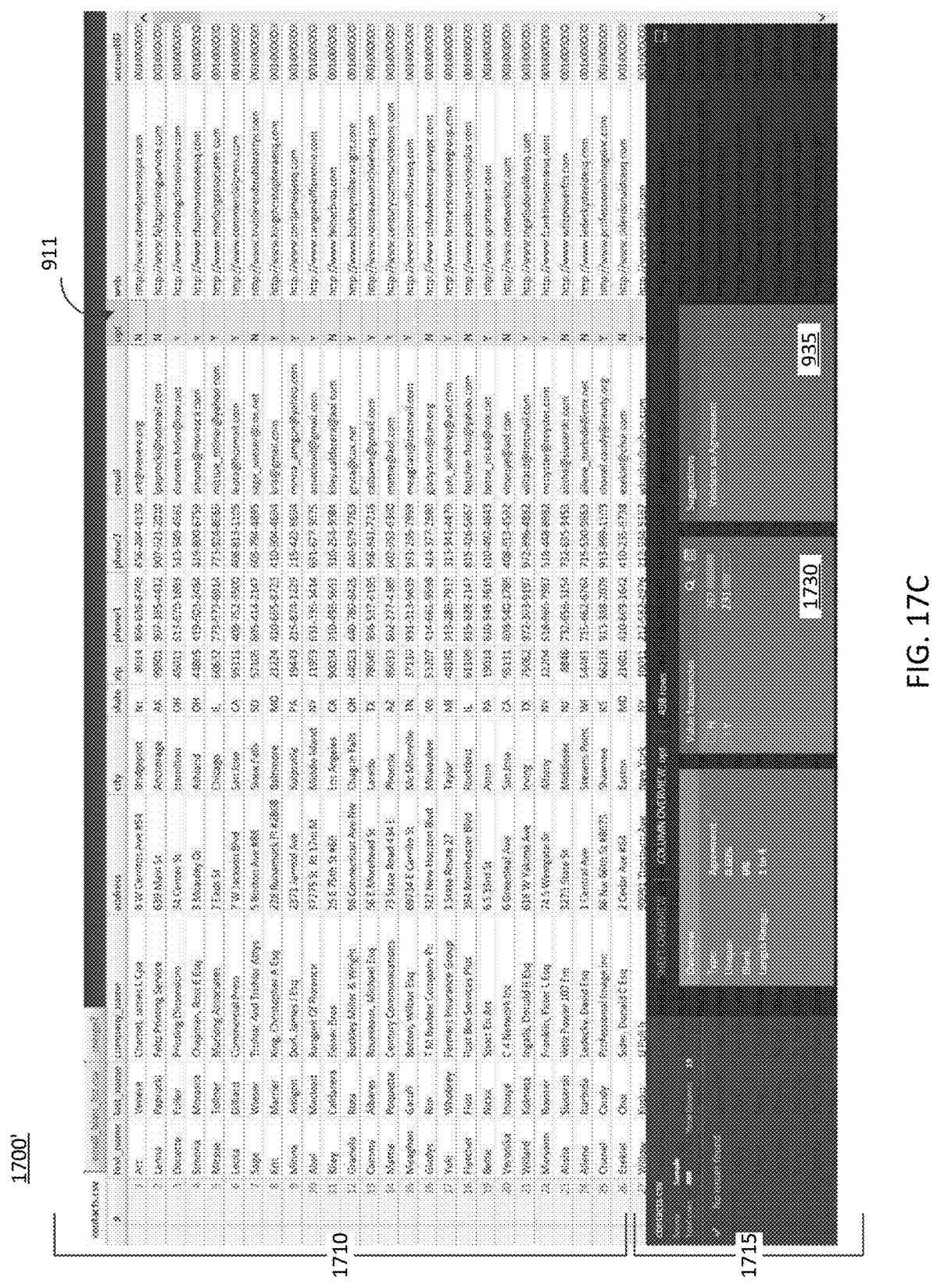

FIG. 17B shows an example of a user interface 1700' after the value change of FIG. 17A according to one embodiment. In this example, the value frequency card 1730 has been updated such that all FALSE values in column 911 have been updated to N values, as a result of the user's interaction with the graphical representation of value frequencies (930). FIG. 17C shows an example of a user interface 1700' after value changes according to one embodiment. In this example, the value frequency card 1730 has been updated such that all TRUE values in column 911 have been updated to Y values after the change shown in FIG. 17B, as a result of the user's interaction with the graphical representation of value frequencies (930). Now, the user can see that the opt numbers are close to 50% N and 50% Y, with N values being slightly higher (267 versus 231). This data is now useful to the user in understanding users' opt in preferences, as compared to the four values previously listed.

Figure 18:
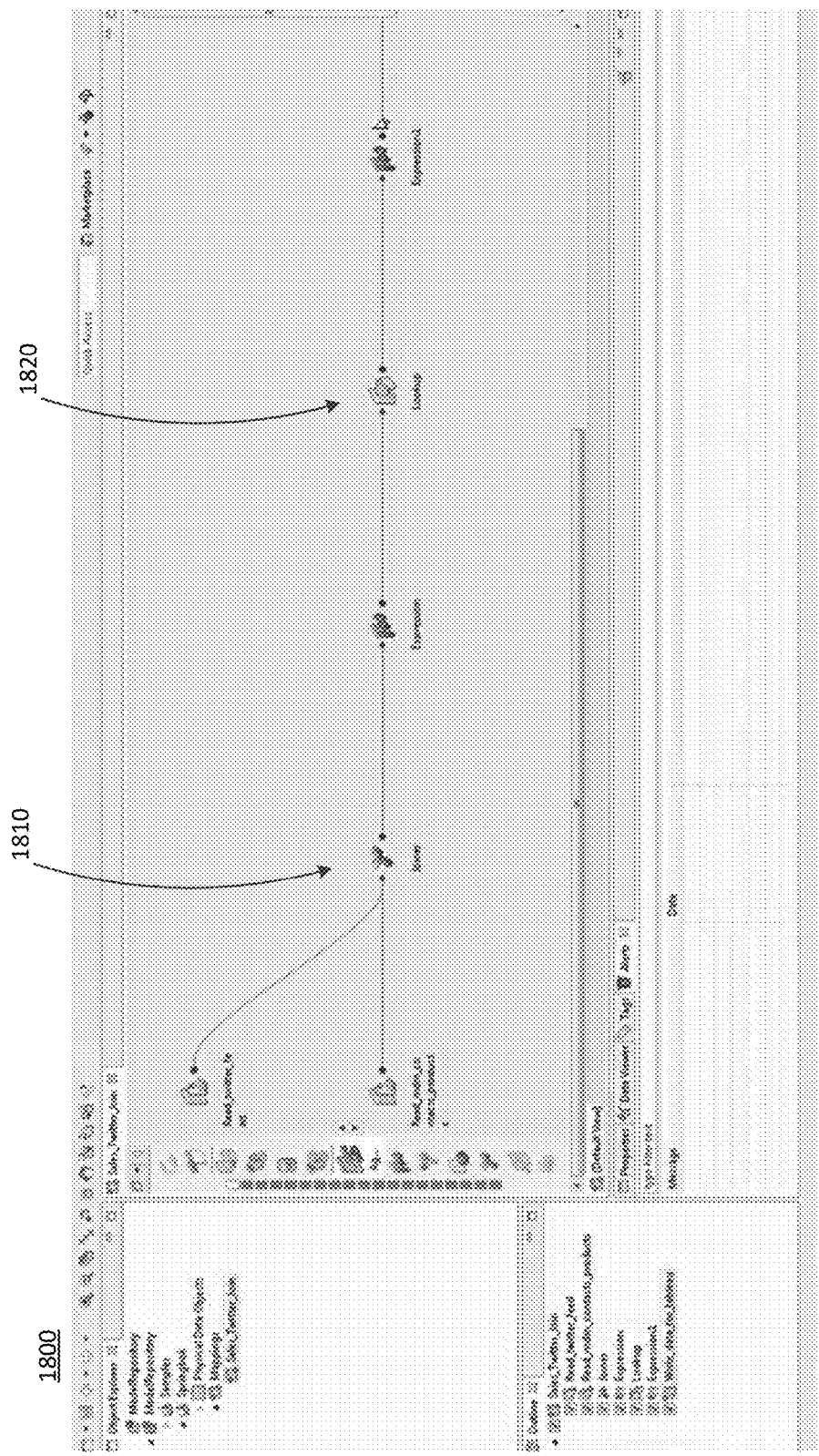
FIG. 18 is a diagram showing the conversion of stored action history information into a mapping that can be used for non-designer users, such as IT personnel in an organization according to one embodiment.

FIG. 18 is a diagram showing the conversion of stored action history information into a mapping that can be used for non-designer users, such as IT personnel in an organization according to one embodiment. A user interface 1800 shows the various actions applied to the spreadsheets in a graphical format. In the first action, the tables Read_twitter_feed and Read_mdm_contacts_product are joined 1810. Next an expression is used and a lookup applied 1820, e.g., see FIGS. 9A-9B, and then another expression. In this way, users can collaborate using language everyone understands, and the mapping is in a format that the user is familiar with.

In addition to converting the data into a mapping, many export options are available for use. For example, the user can export the data to Tableau, Salesforce Wave, or Excel to name a few.

Additional Configuration Considerations

The system described herein may be implemented using a single computer, or a network of computers, including cloud-based computer implementations. The computers are preferably server class computers including one or more high-performance CPUs and 1 G or more of main memory, as well as 500 Gb to 2 Tb of computer readable, persistent storage, and running an operating system such as LINUX or variants thereof. The operations of the system as described herein can be controlled through a combination of hardware and computer programs installed in computer storage and executed by the processors of such servers to perform the functions described herein. The system 100 includes other hardware elements necessary for the operations described here, including network interfaces and protocols, input devices for data entry, and output devices for display, printing, or other presentations of data, but which are not shown here in order to avoid obscuring the relevant details of the embodiments.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein, the term "module" refers to computer program logic utilized to provide the specified functionality. In one embodiment, program modules are stored on a storage device, loaded into memory, and executed by a processor. Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

The present invention also relates to an apparatus for performing the operations herein. This apparatus may be specially constructed or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining similarity of entities across identifier spaces. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-executed method for previewing a composite data set, comprising:
    retrieving from one or more sources first and second data sets;
    formatting the first and second data sets into a plurality of columns of data values;
    profiling the data values from the first and second data sets to identify data types and data domains for the plurality of columns of data values;
    identifying at least one column of the first data set matching at least one column of the second data set based on the profiling;
    calculating a match metric for the at least one column matched between the first and second data sets;
    unifying the first and second data sets using the at least one column and a unifying action, wherein the unifying action is determined based on an overlap between the first data set and the second data set;

generating a preview view of the composite spreadsheet showing the first and second data sets unified using the at least one column prior to committing the unifying of the first and second data sets into the composite spreadsheet, the preview view visually indicating the at least one column matched between the first and second data sets, a plurality of non-matching columns among the first and second data sets, and the match metric; and in response to receiving an indication from a user, committing the unifying of the first and second data sets into the composite spreadsheet.

2. The computer-executed method of claim 1, wherein the unifying action comprises a join function, wherein the data sets are appended side by side, and wherein the at least one matching column is at least one key column joining the data sets.

3. The computer-executed method of claim 2, wherein identifying at least one column of the first data set matching at least one column of the second data set further comprises:
identifying at least one key column for joining the data sets; and
receiving user selection of a key column;
wherein the data sets are joined using the selected key column.

4. The computer-executed method of claim 3, further comprising:
presenting the identified at least one key column for display to the user; and
presenting the match metric as the percentage overlap for the at one least key column between the data sets.

5. The computer-executed method of claim 1, wherein the unifying action comprises a merge function and wherein the data sets are appended with top and bottom.

6. The computer-executed method of claim 5, further comprising:
presenting the identified at least one matching column for display to the user; and
presenting the match metric as the percentage overlap for the at least one matching column between the data sets.

7. The computer-executed method of claim 1, wherein the unifying action comprises a lookup function and wherein a column of data from the first data set is added to the second data set.

8. The computer-executed method of claim 1, wherein the one or more sources are selected from the group consisting of databases, applications, and local files.

9. The computer-executed method of claim 1, wherein the unifying of the first and second data sets into the single composite spreadsheet is in response to a user selection of a composite data control.

10. The computer-executed method of claim 1, further comprising:
profiling the composite spreadsheet;
providing one or more data refinement suggestions for at least one column of the composite spreadsheet based on the profiling of the composite spreadsheet, wherein the one or more data refinement suggestions comprise one or more of: validating a known data type, identifying data inconsistencies, standardizing data formats, or enriching the data from additional sources.

11. The computer-executed method of claim 1, further comprising:
storing the unifying and any actions taken on the composite spreadsheet as a procedure template configured to be applied to other data sets.

12. An apparatus for previewing a composite data set, the apparatus comprising:
one or more processors; and
one or more memories operatively coupled to at least one of the one or more processors and having instructions stored thereon that, when executed by at least one of the one or more processors, cause at least one of the one or more processors to:
retrieve from one or more sources first and second data sets;
format the first and second data sets into a plurality of columns of data values;
profile the data values from the first and second data sets to identify data types and data domains for the plurality of columns of data values;
identify at least one column of the first data set matching at least one column of the second data set based on the profiling;
calculate a match metric for the at least one column matched between the first and second data sets;
unify the first and second data sets using the at least one column and a unifying action, wherein the unifying action is determined based on an overlap between the first data set and the second data set;
generate a preview view of the composite spreadsheet showing the first and second data sets unified using the at least one column prior to committing the unifying of the first and second data sets into the composite spreadsheet, the preview view visually indicating the at least one column matched between the first and second data sets, a plurality of non-matching columns among the first and second data sets, and the match metric; and
in response to receiving an indication from a user, commit the unifying of the first and second data sets into the composite spreadsheet.

13. The apparatus of claim 12, wherein the unifying action comprises a join function, wherein the data sets are appended side by side, and wherein the at least one matching column is at least one key column joining the data sets.

14. The apparatus of claim 13, wherein the instructions that, when executed by at least one of the one or more processors, cause at least one of the one or more processors to identify at least one column of the first data set matching at least one column of the second data set further cause at least one of the one or more processors to:
identify at least one key column for joining the data sets; and
receive user selection of a key column;
wherein the data sets are joined using the selected key column.

15. The apparatus of claim 12, wherein the unifying action comprises a merge function and wherein the data sets are appended with top and bottom.

16. The apparatus of claim 12, wherein the unifying action comprises a lookup function and wherein a column of data from the first data set is added to the second data set.

17. The apparatus of claim 12, wherein the one or more sources are selected from the group consisting of databases, applications, and local files.

18. The apparatus of claim 12, wherein the unifying of the first and second data sets into the single composite spreadsheet is in response to a user selection of a composite data control.

19. The apparatus of claim 12, wherein at least one of the one or more memories has further instructions stored thereon that, when executed by at least one of the one or more processors, cause at least one of the one or more processors to:

profile the composite spreadsheet;
provide one or more data refinement suggestions for at least one column of the composite spreadsheet based on the profiling of the composite spreadsheet, wherein the one or more data refinement suggestions comprise one or more of: validating a known data type, identifying data inconsistencies, standardizing data formats, or enriching the data from additional sources.

20. The apparatus of claim 12, wherein at least one of the one or more memories has further instructions stored thereon that, when executed by at least one of the one or more processors, cause at least one of the one or more processors to:
store the unifying and any actions taken on the composite spreadsheet as a procedure template configured to be applied to other data sets.

21. At least one non-transitory computer-readable medium storing computer-readable instructions that, when executed by one or more computing devices, cause at least one of the one or more computing devices to:
retrieve from one or more sources first and second data sets;
format the first and second data sets into a plurality of columns of data values;
profile the data values from the first and second data sets to identify data types and data domains for the plurality of columns of data values;
identify at least one column of the first data set matching at least one column of the second data set based on the profiling;
calculate a match metric for the at least one column matched between the first and second data sets;
unify the first and second data sets using the at least one column and a unifying action, wherein the unifying action is determined based on an overlap between the first data set and the second data set;
generate a preview view of the composite spreadsheet showing the first and second data sets unified using the at least one column prior to committing the unifying of the first and second data sets into the composite spreadsheet, the preview view visually indicating the at least one column matched between the first and second data sets, a plurality of non-matching columns among the first and second data sets, and the match metric; and
in response to receiving an indication from a user, commit the unifying of the first and second data sets into the composite spreadsheet.

22. The at least one non-transitory computer-readable medium of claim 21, wherein the unifying action comprises a join function, wherein the data sets are appended side by side, and wherein the at least one matching column is at least one key column joining the data sets.

23. The at least one non-transitory computer-readable medium of claim 22, wherein the instructions that, when executed by at least one of the one or more computing devices, cause at least one of the one or more computing devices to identify at least one column of the first data set matching at least one column of the second data set further cause at least one of the one or more computing devices to:
identify at least one key column for joining the data sets; and
receive user selection of a key column;
wherein the data sets are joined using the selected key column.

24. The at least one non-transitory computer-readable medium of claim 21, wherein the unifying action comprises a merge function and wherein the data sets are appended with top and bottom.

25. The at least one non-transitory computer-readable medium of claim 21, wherein the unifying action comprises a lookup function and wherein a column of data from the first data set is added to the second data set.

26. The at least one non-transitory computer-readable medium of claim 21, wherein the one or more sources are selected from the group consisting of databases, applications, and local files.

27. The at least one non-transitory computer-readable medium of claim 21, wherein the unifying of the first and second data sets into the single composite spreadsheet is in response to a user selection of a composite data control.

28. The at least one non-transitory computer-readable medium of claim 21, further storing computer-readable instructions that, when executed by at least one of the one or more computing devices, cause at least one of the one or more computing devices to:
profile the composite spreadsheet;
provide one or more data refinement suggestions for at least one column of the composite spreadsheet based on the profiling of the composite spreadsheet, wherein the one or more data refinement suggestions comprise one or more of: validating a known data type, identifying data inconsistencies, standardizing data formats, or enriching the data from additional sources.

29. The at least one non-transitory computer-readable medium of claim 21, further storing computer-readable instructions that, when executed by at least one of the one or more computing devices, cause at least one of the one or more computing devices to:
store the unifying and any actions taken on the composite spreadsheet as a procedure template configured to be applied to other data sets.

* * * * *